(12) United States Patent
Mohamed et al.

(10) Patent No.: US 7,761,392 B2
(45) Date of Patent: Jul. 20, 2010

(54) CONFIGURABLE INFINITE LOGIC SIGNAL PROCESSING NETWORK AND GENETIC COMPUTING METHOD OF DESIGNING THE SAME

(75) Inventors: Magdi A. Mohamed, Schaumburg, IL (US); Weimin Xiao, Hoffman Estates, IL (US); Chi Zhou, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 932 days.

(21) Appl. No.: 11/554,734

(22) Filed: Oct. 31, 2006

(65) Prior Publication Data
US 2008/0103995 A1    May 1, 2008

(51) Int. Cl.
*G06N 3/00* (2006.01)
*G06N 3/02* (2006.01)
*G06F 15/18* (2006.01)
(52) U.S. Cl. .......................................... 706/13
(58) Field of Classification Search ..................... 706/13
See application file for complete search history.

(56) References Cited

U.S. PATENT DOCUMENTS 7,656,978 B2 *   2/2010   Mohamed et al. ............ 375/350

\* cited by examiner

*Primary Examiner*—Michael Holmes

(57) ABSTRACT

Signal processing networks (700, 800, 1008, 1010, 1012) that include a configurable infinite logic aggregator (100) that can be configured as an infinite logic AND gate and infinite logic OR gate or as other gates along a continuum of function between the two by adjusting control signal magnitudes and a configurable infinite logic signal inverter (500) are provided. A method of designing such networks that includes a genetic programming program (1802) e.g., a gene expression programming program (1600), for designing the network topology, in combination with a numerical optimization (1804), e.g., a hybrid genetic algorithm/differential evolution numerical optimization (1700) for setting control signal values of the network and optionally other numerical parameters is provided.

24 Claims, 15 Drawing Sheets

FIG. 10
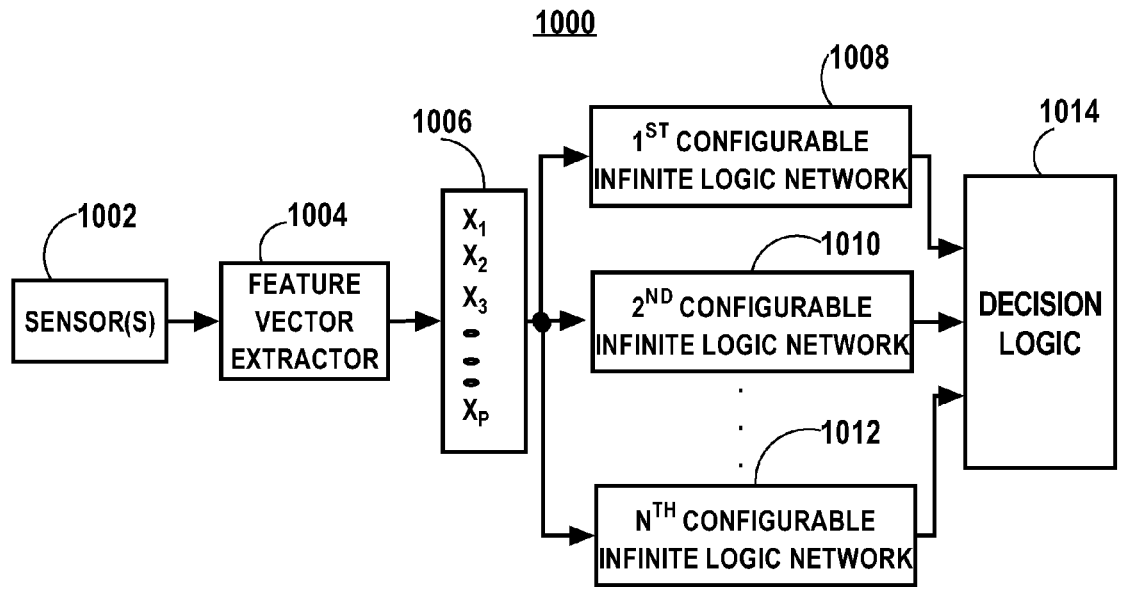
FIG. 11
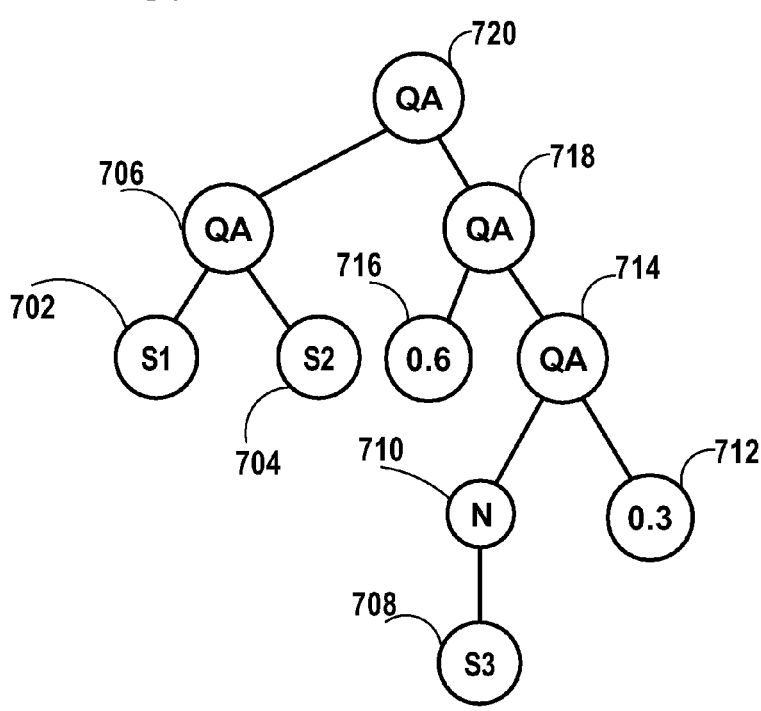
FIG. 12
[QA, QA, S1, S2, QA, 0.6, QA, N, S3, 0.3]

CONFIGURABLE INFINITE LOGIC SIGNAL PROCESSING NETWORK AND GENETIC COMPUTING METHOD OF DESIGNING THE SAME

FIELD OF THE INVENTION

The present invention relates generally to signal processing and machine learning.

BACKGROUND

At present digital signal processing has come to predominate over signal processing performed with linear and other analog electrical devices. Whereas, the operation of analog devices is analyzed, taught and described using mathematical equations, digital signal processing works by actually applying mathematical and logical equations directly to signals. Digital signal processing is typically performed using a programmable digital signal processor that is capable of performing various mathematical, logical and bit-level operations at high speed. For many technical applications simplifying assumptions such as assuming linearity, and orthogonality are justified, and justify using standard techniques.

Genetic programming is type of machine learning that has been used to design circuits, write programs and find mathematical expressions that apply to particular technical problems. Co-pending patent application Ser. No. 10/101,814 entitled "Gene Expression Programming Algorithm" by Weimin Xiao et al discloses a type of genetic programming software. Genetic programming software is typically started with a long list of building blocks from which it constructs its output. For example in the case of using genetic programming to design circuits, many types of circuit elements are provided. Doing so increases the size of the space of solutions that the genetic programming software must search and thereby increases the run time. Also, the genetic programming software may find a relatively costly solution that includes very high number of components.

Boolean logic is along with basic arithmetic operation at the core of computers including digital signal processors. Infinite valued logic is a generalization of Boolean logic. Whereas Boolean logic functions (e.g., AND, OR, XOR, NOT) have binary valued input and output, in infinite-valued logic both the input and output vary within specified domains (e.g., zero to one). Thus, infinite-valued logic is more general and more powerful. Some complicated expressions have been proposed for infinite-valued logic. For example see {(1) Fuzzy Sets, Uncertainty, and Information, by George J. Klir and Tina A. Folger, Printice Hall, 1988. (2) Fuzzy Sets and Fuzzy Logic Theory and Applications, by George J. Klir and Bo Yuan, Printice Hall, 1995}. It would be desirable to have simpler more powerful infinite logic expressions.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 10 is a block diagram of a pattern recognition system that uses infinite logic signal processing networks that include infinite logic signal aggregators of the type described with reference to FIGS. 1-4 and infinite logic signal inverters of the type described with reference to FIGS. 5-6;

FIG. 11 is a tree representation of the signal processing network shown in FIG. 7;

FIG. 12 is a chromosome array that encodes the tree shown in FIG. 11;

Figure 1:
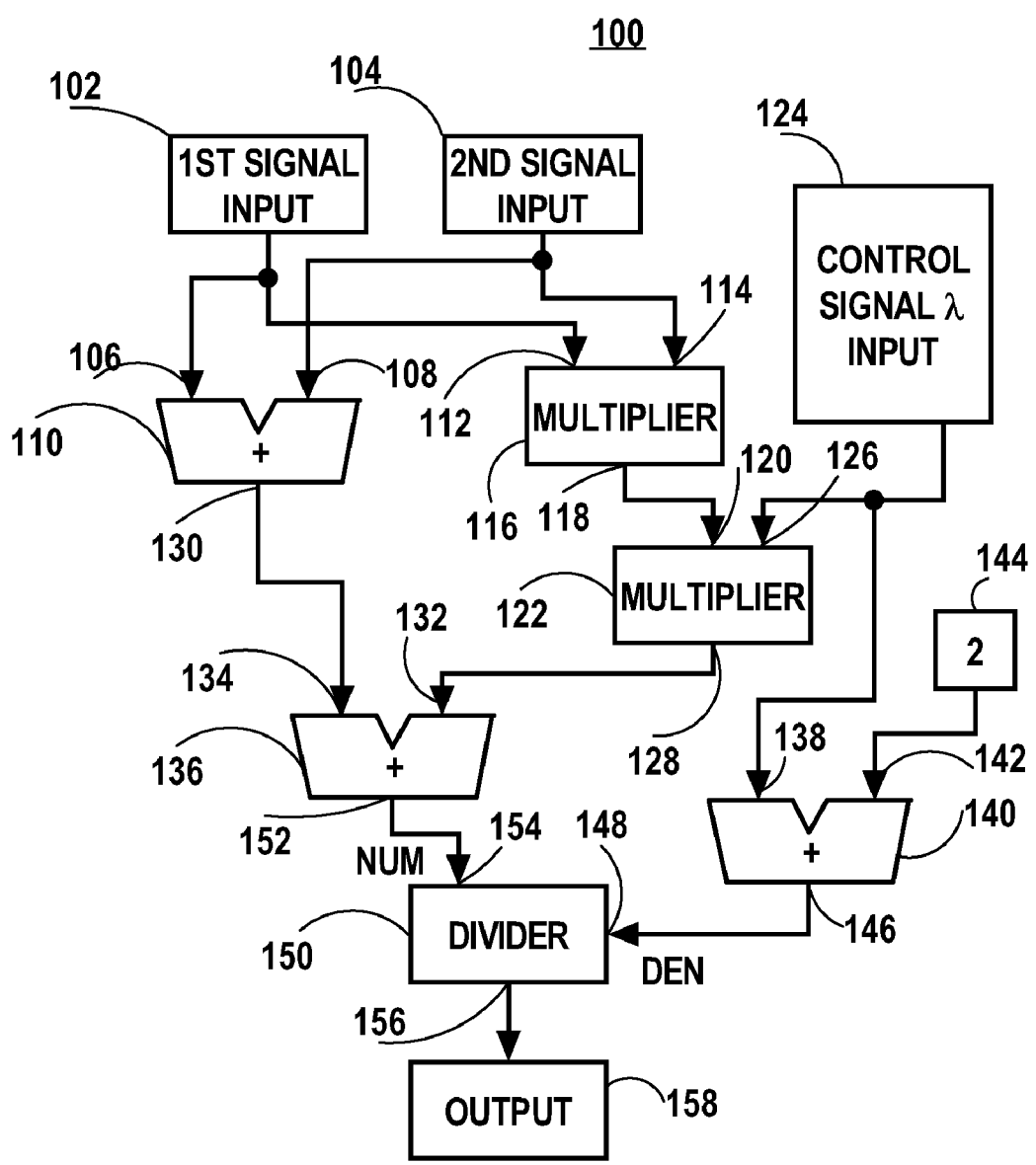
FIG. 1 is a block diagram of a configurable infinite logic signal aggregator according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to configurable infinite logic signal processing networks and genetic algorithm methods of designing the same. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of configurable infinite logic signal processing networks and genetic algorithm methods of designing the same described herein. The non-processor circuits may include, but are not limited to, signal drivers, clock circuits, power source circuits, and user input devices. As such, these functions may be interpreted as steps of a method to perform signal processing using configurable infinite logic signal processing networks and methods of designing configurable infinite logic signal processing networks. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a block diagram of a configurable infinite logic signal aggregator 100 according to an embodiment of the invention. The aggregator 100 comprises a first signal input 102, and a second signal input 104 which are coupled to a first input 106 and a second input 108 of a first adder 110 and are also coupled to a first input 112 and a second input 114 of a first multiplier 116. An output 118 of the first multiplier 116 is coupled to a first input 120 of a second multiplier 122. A control signal input 124 of the aggregator 100 is coupled to a second input 126 of the second multiplier 122. An output 128 of the second multiplier 122 and an output 130 of the first adder 110 are coupled to a first input 132 and a second input 134 respectively of a second adder 136. The control signal input 124 of the aggregator 100 is also coupled to a first input 138 of a third adder 140. A second input 142 of the third adder 140 is set to a fixed value of two 144. An output 146 of the third adder 140 is coupled to a denominator input 148 of a divider 150. An output 152 of the second adder 136 is coupled to a numerator input 154 of the divider 150. An output 156 of the divider 150 is coupled to an output 158 of the infinite logic signal aggregator 100.

The operation of the configurable infinite logic signal aggregator 100 can be described by the following equation:

$$A(x, y) = \frac{x + y + \lambda xy}{2 + \lambda} \quad \text{EQU. 1}$$

where,
$x \in [0,1]$ is the signal applied to the first input 102,
$y \in [0,1]$ is the signal applied to the second input 104,
$\lambda \in [-1, +\text{INFINITY})$ is the control signal applied to the control signal input 124, and
$A(x,y) \in [0,1]$ is the output of the configurable infinite logic signal aggregator 100.

Equation 1 describes the operation of the two input aggregator shown in FIG. 1. The configurable infinite logic signal aggregators disclosed herein can be extended to accept more than two inputs. A generalization of equation 1 which describes the operation of configurable infinite logic signal aggregators with more than two inputs is described by the following piecewise equation:

$$A_\lambda(a_1, \ldots, a_n) = \begin{cases} \dfrac{\prod_{i=1}^{n}(1 + \lambda a_i) - 1}{\prod_{i=1}^{n}(1 + \lambda) - 1} & \lambda \geq -1, \lambda \neq 0 \\ \dfrac{1}{n}\sum_{i=1}^{n} a_i & \lambda = 0 \end{cases} \quad \text{EQU. 2}$$

where,
$\lambda \geq -1$ is the magnitude of the control signal;
$a_k \in [0,1]$, is a value of a $k^{th}$ input signal;
n is a number of input signals; and
$A_\lambda(a_1, \ldots, a_n) \in [0,1]$ is the output signal magnitude.

The infinite logic signal aggregator 100 is configurable in that changing the magnitude of the control signal λ changes the aggregator 100 from an infinite logic AND gate through a continuum of input-output functions to an infinite logic OR gate. The continuum of functions includes the average function at a value of λ equal to zero.

Figure 2:
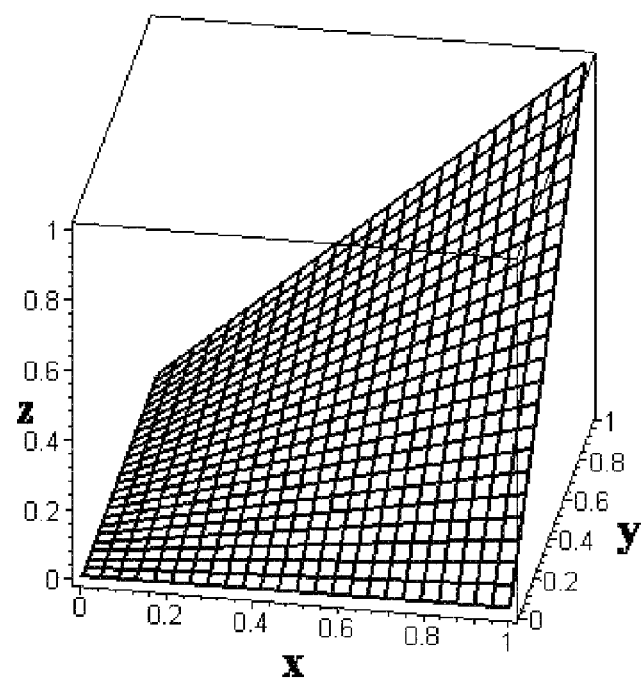
FIG. 2 is a surface plot showing an input-output relation of the configurable infinite logic signal aggregator shown in FIG. 1 with a first setting of a control signal.
Figure 3:
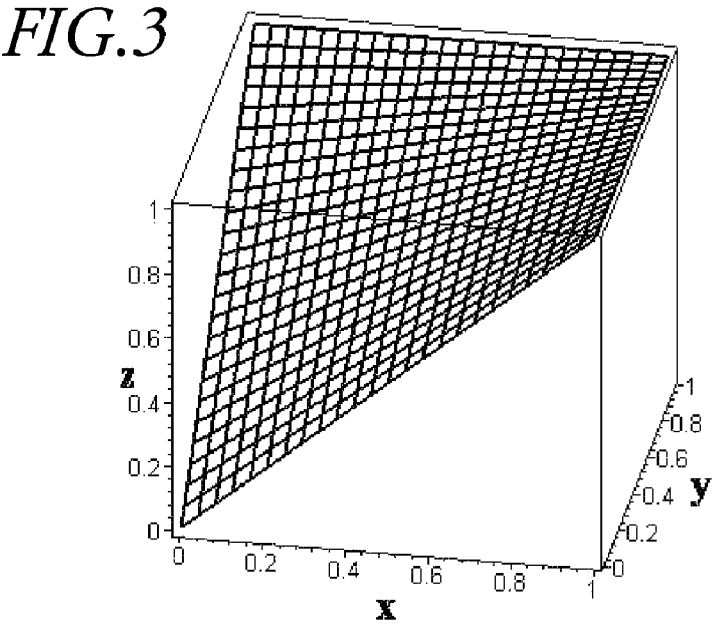
FIG. 3 is a surface plot showing the input-output relation of the configurable infinite logic signal aggregator shown in FIG. 1 with a second setting of the control signal.
Figure 4:
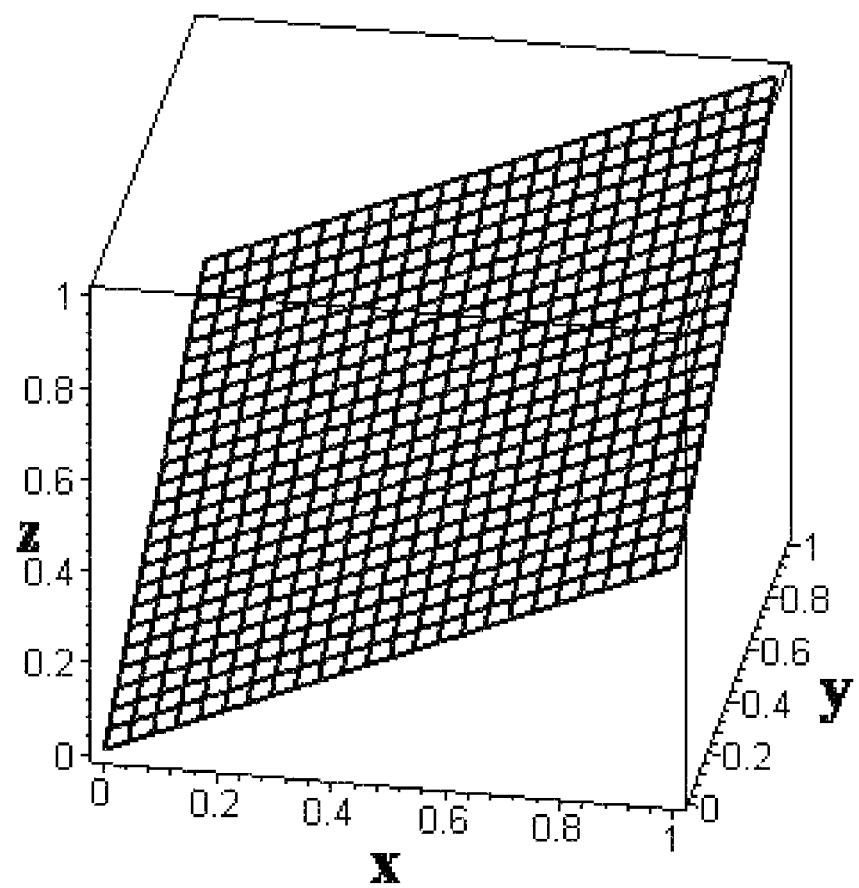
FIG. 4 is a surface plot showing the input-output relation of the configurable infinite logic signal aggregator shown in FIG. 1 with a third setting of the control signal.

FIGS. 2-4 show the input-output relation of the aggregator 100 for various settings of the control signal λ. In FIGS. 2-4 the X-axis indicates the magnitude of the signal applied to the first input 102, the Y-axis indicates the magnitude of the signal applied to the second input 104 and the Z-axis indicates output of the configurable infinite logic signal aggregator 100.

Adjusting the control signal λ to a high value, e.g., one-hundred causes the aggregator 100 to operate as an infinite valued logic AND gate. FIG. 2 shows the input-output relation of the aggregator 100 when the control signal λ is set to a high value. Note that the infinite valued logic AND function is a generalization of the Boolean AND function. This is apparent in FIG. 2, to wit when the input signals are (0,1), (1,0) or (0,0) the output is zero and when the input signals are (1,1) the output is one.

Adjusting the control signal λ to minus one causes the aggregator 100 to operate as an infinite valued logic OR gate. FIG. 3 shows the input-output relation of the aggregator 100 when the control signal is λ is set to negative one. The infinite valued logic OR function is a generalization of the Boolean OR function, to wit when the input signals are (0,1), (1,0) or (1,1) the output is one and when the input signals are (0,0) the output signal is zero.

Adjusting the control signal λ to values in the range of −1 to a predetermined (system dependent) upper limit (e.g., one-hundred) changes the input-output relation of the aggregator 100 to intermediates between the infinite logic AND gate and the infinite logic OR gate.

FIG. 4 shows one special intermediate obtained when the control signal λ is set to zero. In the this case the aggregator 100 functions as a signal averager.

Figure 5:
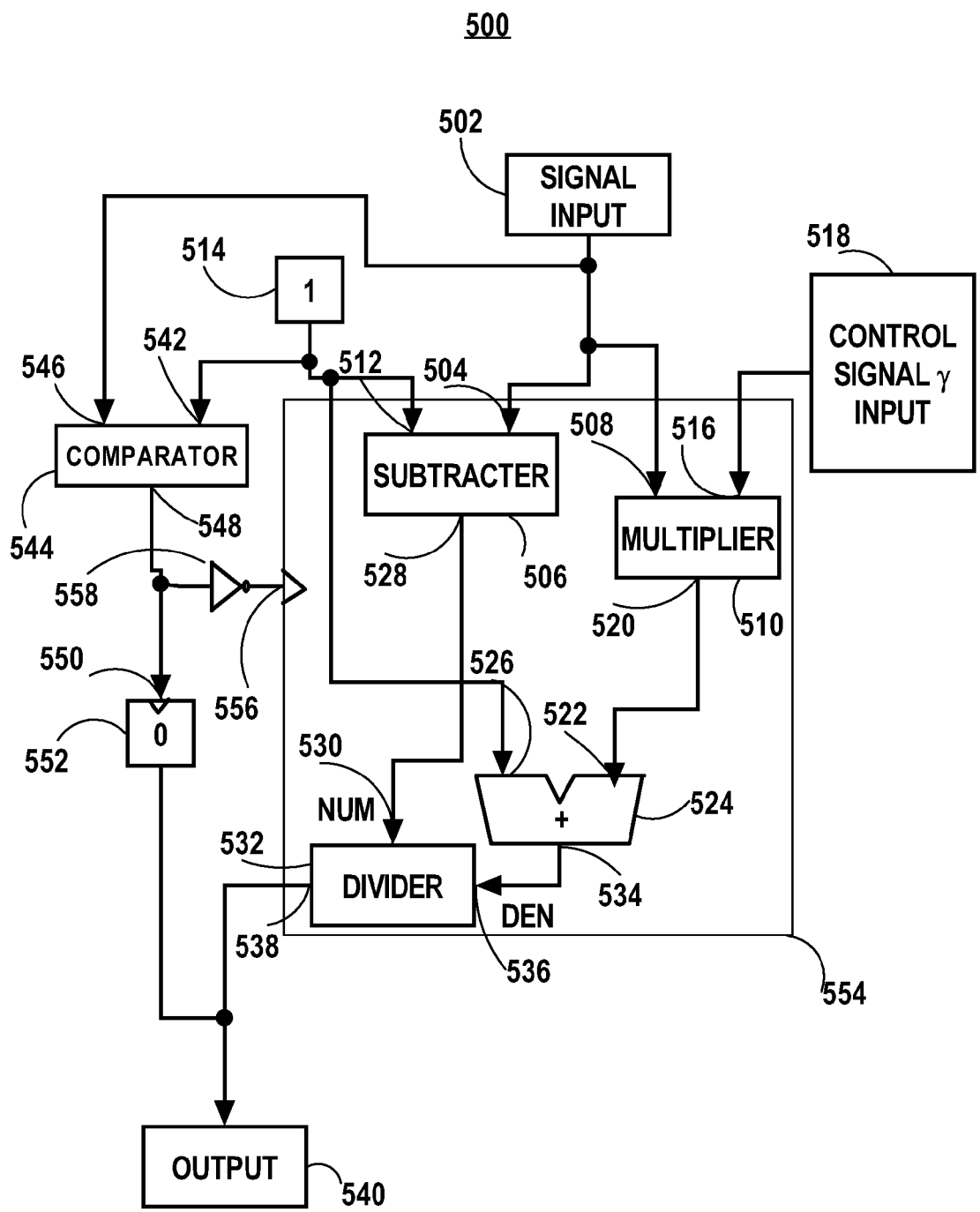
FIG. 5 is a block diagram of a configurable infinite logic signal inverter according to an embodiment of the invention.

In logic systems, such as Boolean logic in addition to an AND function and an OR function, a NOT function, also known as an inverter, is also used. FIG. 5 is a block diagram of a configurable infinite logic signal inverter 500 according to an embodiment of the invention. The inverter 500 comprises a signal input 502 that is coupled to a first input 504 of a subtracter 506 and to a first input 508 of a multiplier 510. A second input 512 of the subtracter 506 is set to a fixed value of one 514. A second input 516 of the multiplier 510 is coupled to a control signal input 518. The control signal of the inverter 500 is denoted γ (gamma). An output 520 of the multiplier 510 is coupled to a first input 522 of an adder 524. A second input 526 of the adder 524 is set to the fixed value of one 514. An output 528 of the subtracter 506 is coupled to a numerator input 530 of a divider 532. An output 534 of the adder 524 is coupled to denominator input 536 of the divider 532. An output 538 of the divider 532 is coupled to an output 540 of the infinite logic signal inverter 500. The signal input is also coupled to a first input 542 of a comparator (e.g., a multi-bit binary comparator) 544. A second input 546 of the comparator 544 is set to the fixed value of one 514. When the input signal received at the signal input 502 is equal to one, the comparator 544 outputs an enable signal at a comparator output 548. The comparator output 548 is coupled to an enable input 550 of a ROM (memory) 552 storing a fixed value of zero. The ROM 552 storing the fixed value of zero is also coupled to the output 540 of the infinite logic signal inverter 500. The subtracter 506, the multiplier 510, the adder 524 and the divider 532 are grouped in a circuit block 554 that has an enable signal input 556. The comparator output 548 is also coupled to the enable signal input 556 of the circuit block 554 through a binary inverter 558. In operation, if the signal received at the signal input 502 of the infinite logic signal inverter 500 is equal to one the comparator 544 will output a signal causing the fixed value of zero stored in the ROM 552 to be coupled to the output 540, otherwise the input signal will be processed through the circuit block 554.

The operation of the infinite logic signal inverter 500 is described by the following equation:

$$Inv(x) = \begin{cases} \dfrac{1-x}{1+\gamma x} & x \neq 1 \\ 0 & x = 1 \end{cases}$$ EQU. 3 where, x∈[0,1], is the input signal to the infinite logic signal inverter 500, applied at the input 502, γ∈[−1,+infinity), is the magnitude of the control signal applied at the control signal input 518, and Inv(x)∈[0,1] is the output of the signal inverter 500, produced at the output 540.

Figure 6:
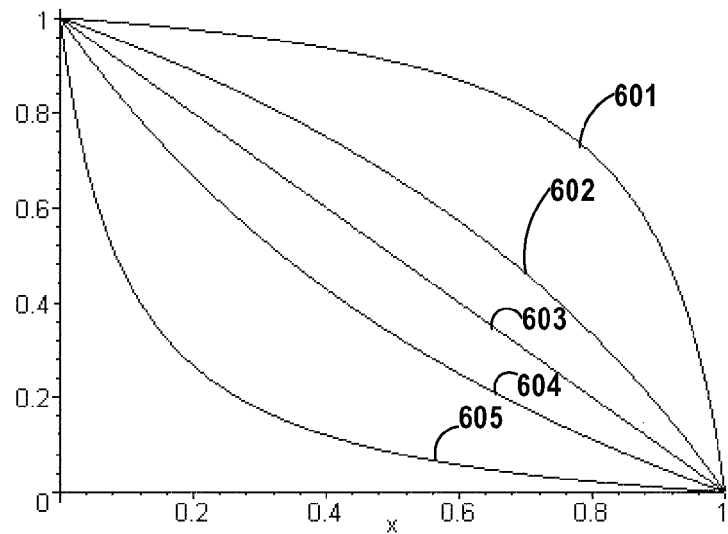
FIG. 6 is a graph including five plots of the input-output relation of the infinite logic signal inverter obtained with five control signal settings.

FIG. 6 is a graph including five plots 601, 602, 603, 604, 605 of the input-output relation of the infinite logic signal inverter 500 obtained with five control signal γ settings −0.9, −0.5, 0.0, 1.0, 10.0. In all cases the infinite logic signal inverter matches the response of a binary logic Boolean inverter to wit when the input is zero the output is one and when the input is one the output is zero. As shown in the graph, between zero and one the response of infinite logic signal inverter is configurable by adjusting the control signal γ.

Although hardware implementations of the configurable infinite logic aggregator 100 and the configurable infinite logic signal inverter 500 are shown in FIGS. 1 and 5, the aggregator 100 and the inverter 500 can also be implemented in software. For the purpose of designing an optimizing circuits that use the aggregator 100 and the inverter 500 (which is described further below), the aggregator 100 and the inverter 500 are suitably implemented in software.

Figure 7:
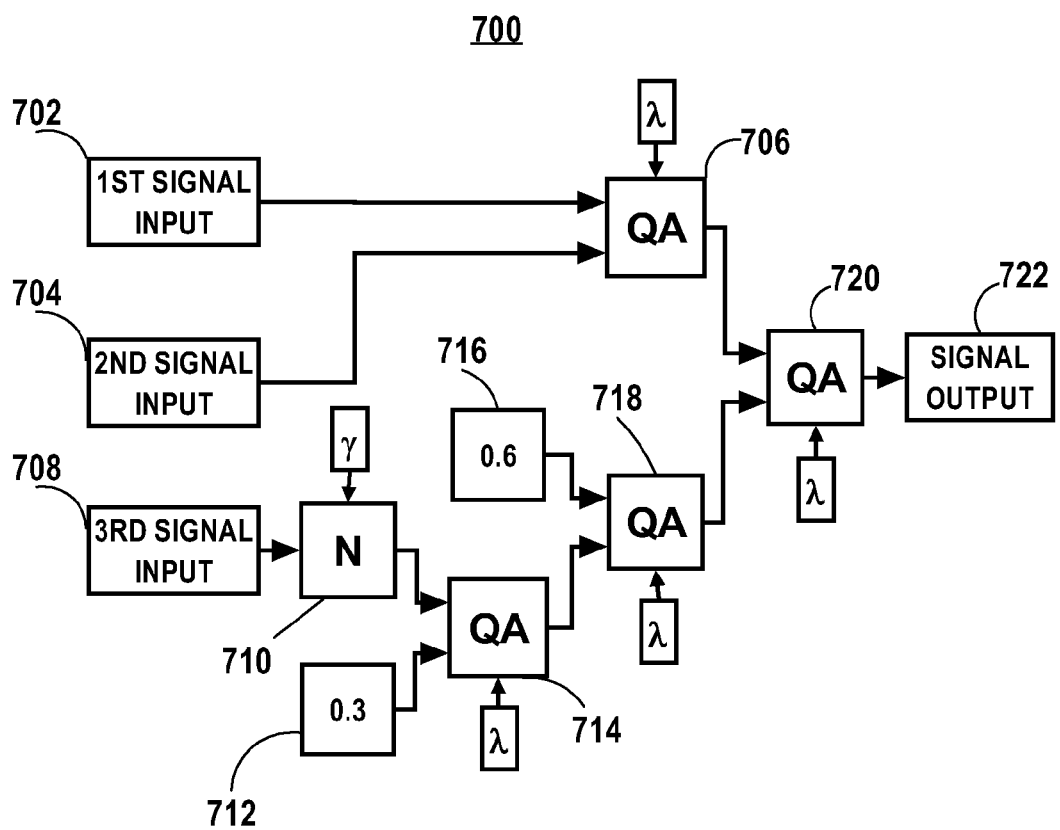
FIG. 7 is a block diagram of a first signal processing network that includes infinite logic signal aggregators of the type described with reference to FIGS. 1-4 and one infinite logic signal inverter of the type described with reference to FIGS. 5-6.

FIG. 7 is a block diagram of a hypothetical example of a signal processing network 700 that includes infinite logic signal aggregators of the type described with reference to FIGS. 1-4 and one infinite logic signal inverter of the type described with reference to FIGS. 5-6. The signal processing network 700 includes a first input 702, and a second input 704 coupled to a first infinite logic aggregator 706. A third input 708 is coupled to an infinite logic signal inverter 710. A fixed value of 0.3 712 and the infinite logic signal inverter 710 are coupled to a second infinite logic aggregator 714. The second infinite logic aggregator 714 and a fixed value of 0.6 716 are coupled to a third infinite logic aggregator 718. The first infinite logic aggregator 706 and the third infinite logic aggregator 718 are coupled to a fourth infinite logic aggregator 720, which is coupled to an output 722 of the signal processing network 700. Each of the aggregators 706, 714, 718, 720 receive individual control signals λ, and the inverter 710 receives the control signal γ. The design and optimization of infinite logic networks such as shown in FIG. 7 is described below with reference to FIGS. 13 to 20.

Figure 8:
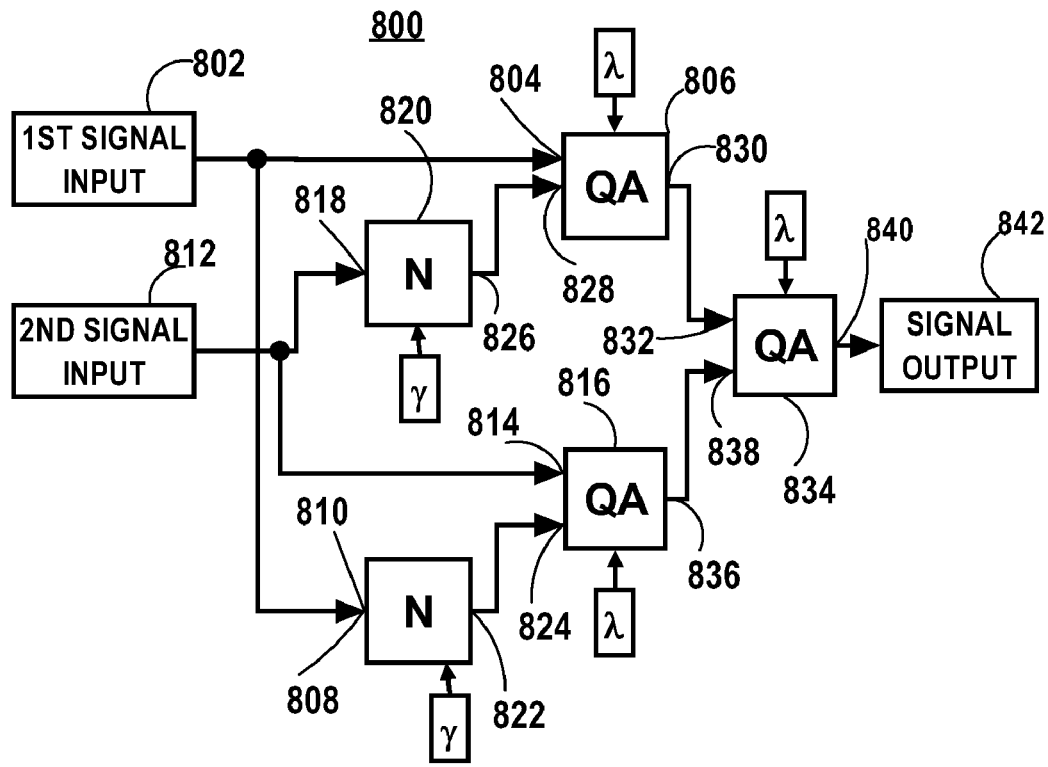
FIG. 8 is a block diagram of an infinite logic XOR network that includes infinite logic signal aggregators of the type described with reference to FIGS. 1-4 and infinite logic signal inverters of the type described with reference to FIGS. 5-6.

FIG. 8 is a block diagram of an infinite logic XOR network 800 that includes infinite logic signal aggregators of the type described with reference to FIGS. 1-4 and infinite logic signal inverters of the type described with reference to FIGS. 5-6. The XOR network 800 has a first input 802 that is coupled to a first input 804 of a first infinite logic aggregator 806 and an input 808 of a first infinite logic signal inverter 810. A second input 812 of the XOR network 800 is coupled to a first input 814 of a second infinite logic aggregator 816 and to an input 818 of a second infinite logic signal inverter 820. An output 822 of the first infinite logic signal inverter 810 is coupled to a second input 824 of the second infinite logic aggregator 816. An output 826 of the second infinite logic signal inverter 820 is coupled to a second input 828 of the first infinite logic aggregator 806. An output 830 of the first infinite logic aggregator 806 is coupled to a first input 832 of a third infinite logic aggregator 834. An output 836 of the second infinite logic aggregator 816 is coupled to a second input 838 of the third infinite logic aggregator 834. An output 840 of the third infinite logic aggregator 834 is coupled to an output 842 of the infinite logic XOR network 800.

The first infinite logic aggregator 806 and the second infinite logic aggregator 816 have their control signals λ set to high values so that they operate as infinite logic AND gates. The third infinite logic aggregator 834 has its control signal λ set to approximately minus one so that it operates as an infinite logic OR gate. The circuit topology and control signal settings of the infinite logic XOR network were determined by a machine learning system that is described below with reference to FIGS. 13 to 20.

Figure 9:
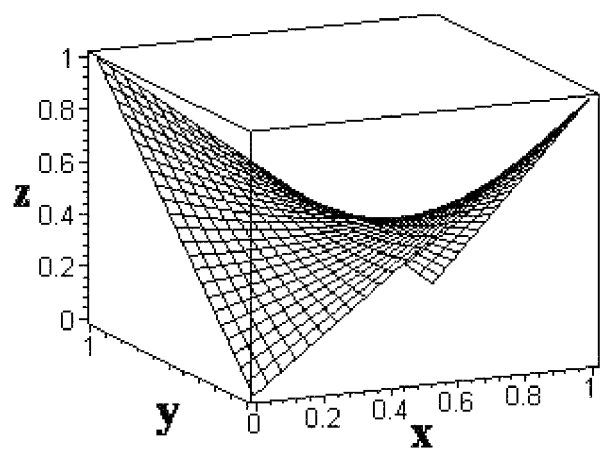
FIG. 9 is a surface plot showing an input-output relation of the infinite logic XOR network shown in FIG. 8.

FIG. 9 is a surface plot showing an input-output relation of the infinite logic XOR network shown in FIG. 8. Note that the infinite logic XOR network substantially matches a binary Boolean XOR gate for the discrete values of (0,0), (0,1), (1,0) and (1,1). Unlike the binary Boolean XOR gate, the infinite logic XOR gate can handle signal that vary within the domain zero to one, not just the discrete values zero and one.

FIG. 10 is a block diagram of a pattern recognition system 1000 that uses infinite logic signal processing networks 1008-1012 that include infinite logic signal aggregators of the type described with reference to FIGS. 1-4 and infinite logic signal inverters of the type described with reference to FIGS. 5-6. The system 1000 includes one or more sensors 1002 to make measurements of subjects to be recognized. The subjects can, for example be people, handwriting, spoken words or objects. Different types sensors 1002 are used to sense selected aspects of the subject to be recognized. For example, people may be recognized by face recognition, voice recognition or fingerprint recognition. Accordingly, a camera, a microphone or a fingerprint sensor can be used as the sensors 1002. Other types of pattern recognition will use other types of sensors known to persons having ordinary skill in the art of pattern recognition.

The sensors 1002 are coupled to a feature vector extractor 1004. The feature vector extractor 1004 performs lossy compression in order to obtain feature vectors 1006 that characterize each measured subject. Feature vector extraction processes are specific to each type of pattern recognition and are known to persons having ordinary skill in the art.

The feature vectors 1006 are input to a set of infinite logic networks 1008, 1010, 1012. Each infinite logic network 1008, 1010, 1012 is trained, for example using supervised training, to distinguish one particular identity or class from other identities or classes of subject. The infinite logic networks 1008, 1010, 1012 can be trained to output a high value or alternatively a low value when a subject that it is designed to recognize is presented to the sensors. Both the internal topology and the control signal settings used by the infinite logic aggregators and the infinite logic signal inverters (not shown in FIG. 10) within each infinite logic network 1008, 1010, 1012 is determined during training. The circuit topology and control signal settings of the infinite logic networks used in the system 1000 is determined by a machine learning system that is described below with reference to FIGS. 13 to 20. A decision logic stage 1014 is coupled to the infinite logic networks 1008, 1010, 1012. The decision logic stage 1014 decides the identity or classification of the subject based on which network 1008, 1010, 1012 output the highest (or alternatively lowest) signal. According to an alternative, there are less networks 1008, 1010, 1012 than there are identities or classes of subjects and the decision logic 1014 maps particular sub-ranges of the output range of one or more of the infinite logic networks 1008, 1010, 1012 to different classes or identities. For example, output of one infinite logic network in the range zero to one-half can be assigned to one class and output in the range one-half to one assigned to another class.

The use of machine learning to design signal processing networks that include infinite logic signal aggregators and infinite logic signal inverters of the types discussed above, will be described next starting with some preliminaries related to the representation of networks in a manner conducive to manipulation by genetic algorithms.

FIG. 11 is a tree representation 1100 of the signal processing network shown in FIG. 7. The tree 1100 comprises nodes connected by edges. Signals flow between nodes, along the edges. The root of the tree (at the top of FIG. 11) is the fourth configurable infinite logic aggregator 720. The leaves of tree 702, 704 716, 708, 712 (also know as terminals) represent signal inputs or fixed values. There are parent-child relationships between nodes of the tree. Except for the root of the tree each node has a parent to which it is connected by a single edge. A child's parent is closer than the child (in terms of the number of edges that must be traversed) to the root node. Signals flow from the network elements represented by the leaves up through the tree 1100 to the root node 720. One skilled in the art will recognize that many circuit topologies can be represented by a tree diagram. The tree diagram captures essential information i.e., which network elements supply signals to which other network elements from the inputs of the network to its output.

FIG. 12 is a chromosome array 1200 that encodes the tree 1100 shown in FIG. 11. Thus, the chromosome array 1200 also encodes the topology of the signal processing network 700. The reference numerals of the elements of the signal processing network 700 are used in FIG. 12 to illustrate the manner in which the tree representation 1100 of the signal processing network is encoded in a depth-first manner. (Alternatively, a breadth first encoding is used). Each element of the chromosome array 1200 is called a gene or a codon. Although, alphanumeric symbols are used in the chromosome array shown in FIG. 12, in practice, integers may be used to represent each network element.

Figure 13:
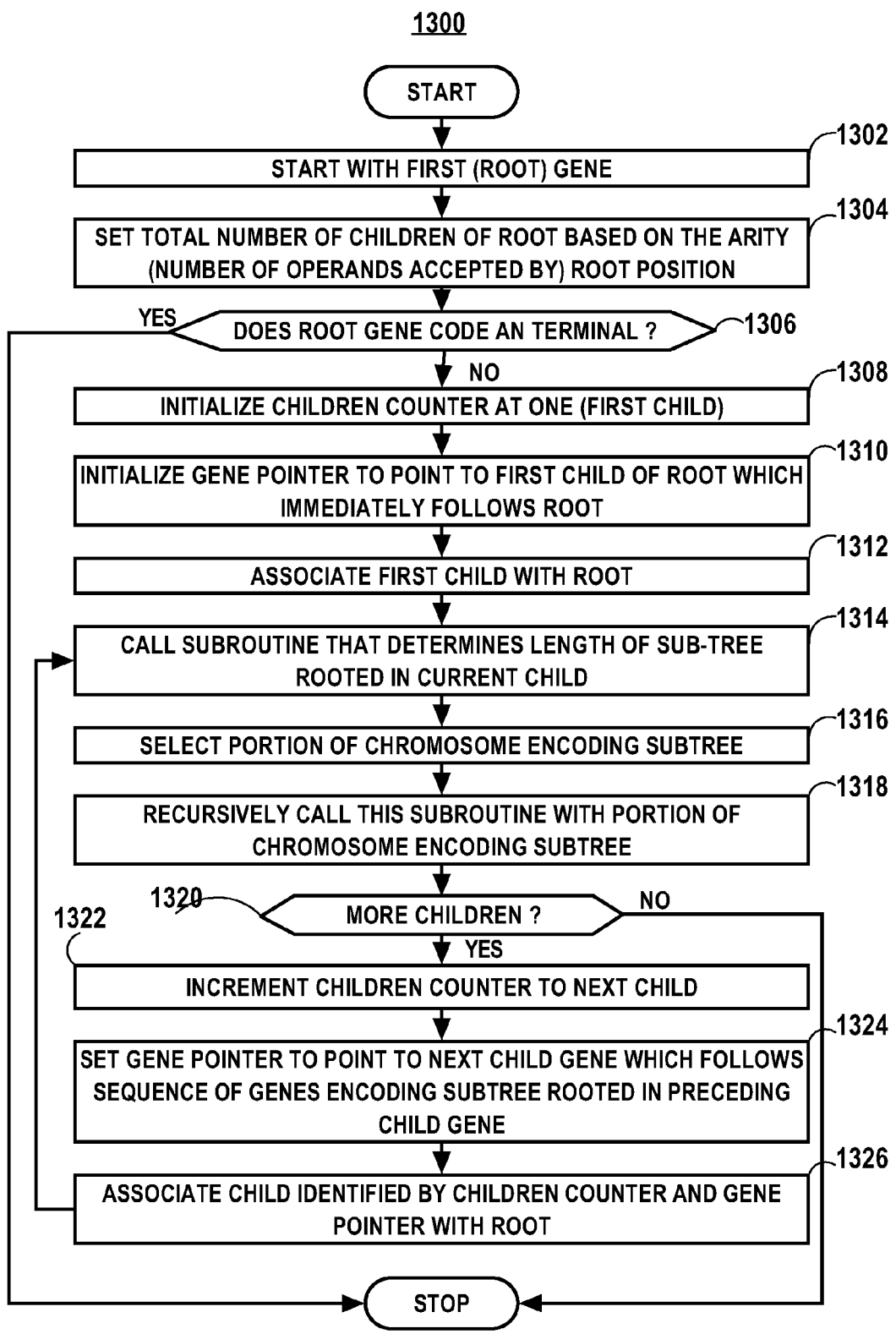
FIG. 13 is a flowchart of a subroutine for decoding chromosome arrays such as shown in FIG. 12.
Figure 14:
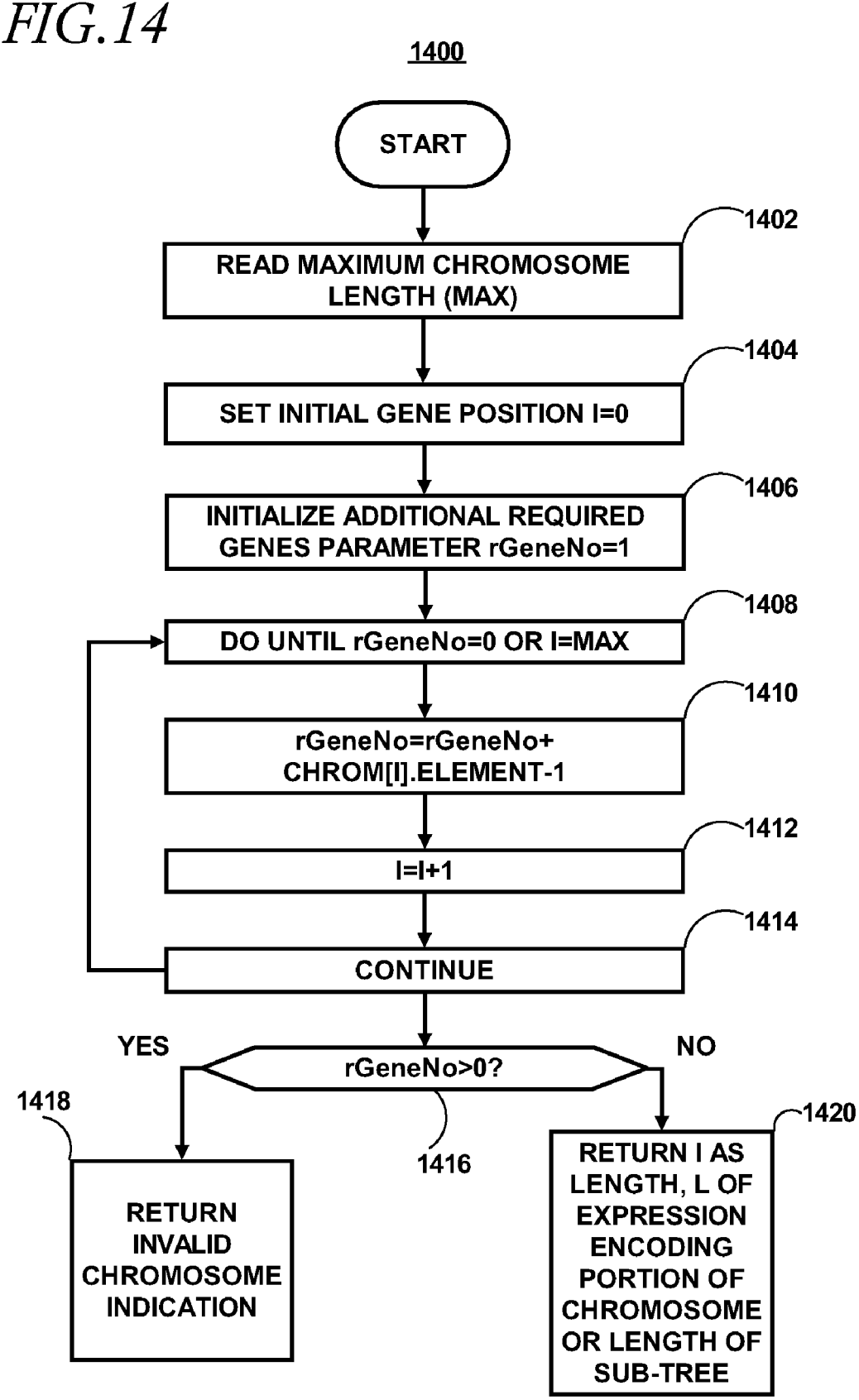
FIG. 14 is a flowchart of a subroutine for determining the length of a portion of a chromosome array representing a tree or sub-tree.

FIG. 13 is a flowchart of a subroutine 1300 for decoding chromosome arrays such as shown in FIG. 12. Decoding implicitly determines a tree structure from a chromosome array by determining all of the parent-child relationships between genes in the chromosome array. Note that the subroutine 1300 is a recursive subroutine that calls itself to handle each sub-tree of the tree represented in a chromosome array. When the subroutine 1300 is initially invoked it receives a full chromosome array, when subroutine 1300 calls itself recursively it receives a portion of the full chromosome that encodes a sub-tree representing a portion of a signal processing network. As indicated in block 1302 the subroutine 1300 starts with the root gene of the chromosome. When the program is called by itself it starts in block 1302 with the first gene of a portion the chromosome representing a sub-tree. In block 1304 the total number of children is set based on the arity of the signal processing element coded by the root gene. The arity or each signal processing element is pre-programmed and may be stored in a table, for example. Block 1306 is a decision block the outcome of which depends on whether the root gene codes a terminal. A terminal is, for example, a constant or a signal input. A tree that has a terminal at the root is degenerate but may arise in certain instances, e.g., as a result of mutation in gene expression programming. If the root is a terminal the subroutine 1300 terminates. On the other hand if the root is not a terminal the subroutine 1300 proceeds to block 1308, in which a children counter for the root node is initialized (e.g., with a value of one) to refer to the first child. Next in block 1310 a gene pointer that takes on integer values referring to gene positions in the chromosome array is set to a value pointing to the first child of the root node, which immediately follows the root gene in the chromosome array. In block 1312 the first child is associated with the root. In an object-oriented implementation of the subroutine 1300 the association of the root node and its children nodes can be stored by assigning a reference to the child node to the root node. Alternatively, parent-child associations can be stored in a children array for each node, where each $k^{th}$ element of the children array for a $k^{th}$ child includes an integer index indicating the position of the child in the chromosome array. In block 1314 a subroutine that determines the length (number of genes) of the sub-tree rooted by the current child is called. (When block 1314 is reached the first time within subroutine 1300, the current child is the first child.) The sub-routine 1314 can be called with a portion of the chromosome array starting with the current child. By way of example, in FIG. 11 the first child of the root node 720 is gene 706. (At this point in the interest of brevity we will dispense with naming the actual signal processing network elements that are encoded by the genes) Referring to FIG. 11, it is seen that the sub-tree rooted in gene 706 includes genes 706, 702, and 704. One embodiment of the subroutine that is called in block 1314 is shown in FIG. 14 and described below. Note that the subroutine used in block 1314 determines the sub-tree without the benefit of a previously established tree such as shown in FIG. 11. The subroutine only uses the linear chromosome representation. After block 1314, in block 1316 the portion of the chromosome array (e.g., 1200) that encodes the sub-tree is selected, and in block 1318 the subroutine 1300 recursively calls itself with the selected sub-tree. Block 1320 is a decision block, the outcome of which depends on whether the root node has more children. Recall that the total number of children was set in block 1304 based on the arity of the root node. If there are no more children, the subroutine 1300 terminates. On the other hand, if there are more children, then in block 1322 the children counter that was initialized in block 1308 is incremented to the next child, and in block 1324 the gene pointer is set to point to the next child which follows the sequence of genes encoding the sub-tree rooted in the preceding child. Block 1324 uses the length of the sub-tree determined in block 1314. By way of example, referring to FIGS. 11, 12. The next gene in the chromosome array 1200 following the genes 706, 702, 704 that encode the sub-tree rooted in the first child 706 of the root 720 is the gene 718 for the second child of the root 720. In block 1326 the child identified by the children counter and the gene pointer is associated with the root as another child of the root. Thereafter, the subroutine 1300 loops back to block 1314.

FIG. 14 is a flowchart of a subroutine 1400 for determining the length of a portion of a chromosome array representing a tree or sub-tree. The method is disclosed in co-pending patent application Ser. No. 11/073,828 entitled "Gene Expression Programming With Enhanced Preservation Of Attributes Contributing To Fitness" to Chi Zhou et al which is assigned in common with the present invention. The subroutine 1400 also detects chromosomes arrays that encode incomplete signal processing networks and are therefore invalid. Invalid chromosomes may sometimes arise in gene expression programming (discussed below) for example by mutation. Certain parts of the subroutine 1400 apply to checking entire chromosomes but are superfluous for checking sub-tree portions of chromosomes. In certain applications, such as the gene expression programming discussed below, the entire chromosome will be validated using the subroutine 1400, before the subroutine 1400 is used to determine the length of sub-tree encoding portions of the chromosome array. In block 1402 a maximum chromosome length is read. The maximum chromosome length is a preprogrammed length that limits the size of signal processing networks encoded in the chromosome arrays. For practical purposes—to control cost and power consumption, limits are set on the size of signal processing networks. In gene expression programming the maximum length is the size of population members. Block 1402 is unnecessary for determining sub-tree size. In block 1404 a gene position pointer is set to zero, which refers to the first gene of the chromosome array. In block 1406 a variable 'rGeneNo' is initialized to one. The variable rGeneNo indicates a number of additional genes required to complete a tree or sub-tree encoding portion of a chromosome. As the subroutine 1400 processes successive genes in a chromosome, the value of rGeneNo varies to reflect the number of appearances of the terminal genes required to provide enough input signals for all signal processing element genes up to the current ($i^{th}$) gene position.

Block 1408 is the start of a program loop that is repeated until rGeneNo=0 (which happens when the end of an expression encoding portion of a chromosome or the end of a sub-tree has been reached) or until i=MAX (which happens when the end of the chromosome (e.g., population member array) has been reached. (If the end of the chromosome is reached without passing enough terminal genes to provide inputs for all signal processing element genes that have been encountered, an incomplete and therefore invalid signal processing network is encoded in the chromosome). For determining the length of sub-tree encoding portions of valid chromosomes the condition i=MAX is superfluous. In each pass through the program loop, in block 1410, the rGeneNo variable is incremented by one less than the arity of the signal processing element represented by the $i^{th}$ gene, and in block 1412 the index i that points to successive genes is incremented by 1. Block 1414 denotes the bottom of the program loop. Block 1416 is a decision block, the outcome of which depends on whether, after the program loop has been exited, the value of the variable rGeneNo is greater than zero. A value greater than zero, indicates that more terminal genes, than are present in a chromosome, would be necessary to provide inputs for all of the signal processing element genes present in the chromosome. If it is determined in block 1416 that the value of rGeneNo is greater than zero, the subroutine 1400 proceeds to block 1418 in which an invalid chromosome indication is returned. If on the other hand, it is determined in block 1416 that rGeneNo is equal to zero, then the routine branches to block 1420 in which the value of the index i is returned as the length (number of genes) of the network encoding portion of the chromosome that was processed by the subroutine 1400 or the length of a sub-tree encoding portion of the chromosome. For determining the length of sub-tree encoding portions of known valid chromosomes decision block 1416 is superfluous, as the subroutine 1400 will always report the length of the sub-tree encoding portion. Alternatively, for determining the length of sub-trees I can be initialized to the position of the root of the sub-tree in the full chromosome array, and in block 1420 the final value of I can be reported back as the last gene in the sub-tree encoding portion of the full chromosome.

Table I below illustrates the operation of the routine for a chromosome representing the infinite logic XOR network shown in FIG. 8.

TABLE I

| Part of Chromosome to be processed | I | Current Gene | Arity | RGeneNo |
|---|---|---|---|---|
| QA, QA, S1, N, S2, QA, S2, N, S1 | 0 | QA | 2 | 2 |
| QA, S1, N, S2, QA, S2, N, S1 | 1 | QA | 2 | 3 |
| S1, N, S2, QA, S2, N, S1 | 2 | S1 | 0 | 2 |
| N, S2, QA, S2, N, S1 | 3 | N | 1 | 2 |
| S2, QA, S2, N, S1 | 4 | S2 | 0 | 1 |
| QA, S2, N, S1 | 5 | QA | 2 | 2 |
| S2, N, S1 | 6 | S2 | 0 | 1 |
| N, S1 | 7 | N | 1 | 1 |
| S1 | 8 | S1 | 0 | 0 |

In Table I the first column shows a portion of a chromosome array representing the infinite logic XOR network that remains to be processed at the beginning of the program loop commenced in block 1408, the second column indicates the value of the i variable at the start of the program loop, the third column shows the gene in the $i^{th}$ position, the fourth column shows required operands for the $i^{th}$ gene, and the fifth column shows the value of the rGeneNo variable after executing block 1410. The chromosome size could have been longer but the network encoding portion ends at the gene in the eighth position. When the gene eight is reached the variable rGeneNo attains a value of zero and the program loop (blocks 1408-1414) is exited, whereupon the routine executes decision block 1416, and the valid length of the chromosome 9 is returned.

Figure 15:
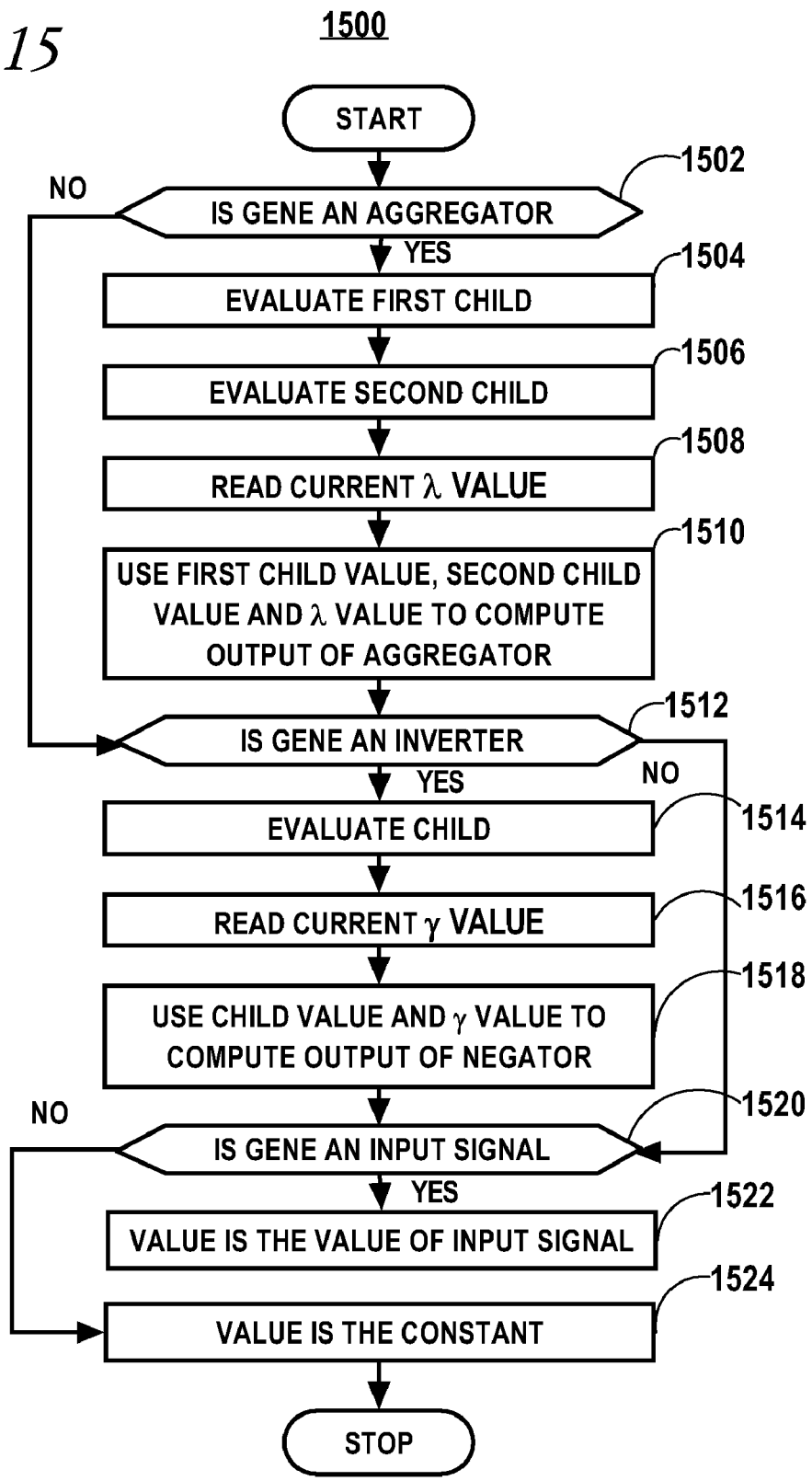
FIG. 15 is a flowchart of a subroutine for evaluating an output of signal processing network represented in a chromosome array using node-child node associations generated by the subroutine shown in FIG. 13.

FIG. 15 is a flowchart of a subroutine 1500 for evaluating an output of a signal processing network represented in a chromosome array using node-child node associations generated by the program shown in FIG. 13. The subroutine 1500 starts with the root gene of a chromosome array and calls itself recursively in order to work through the signal processing network. Decision blocks 1502, 1512, and 1520 determine if the root gene codes an infinite logic signal aggregator, an infinite logic signal inverter, an input signal or a constant. If it is determined in block 1502 that the root gene codes an infinite logic signal aggregator, then in block 1504 the first child gene (which supplies a first input for the aggregator) is evaluated and in block 1506 a second child gene (which supplies a second input for the aggregator) is evaluated. The children of the root gene can be located because the location of the children of each gene was found by the subroutine 1300 shown in FIG. 13 and described above. Note that the evaluations performed in blocks 1504 and 1506 as well as 1514 described below, are accomplished by recursively calling the subroutine 1500 with the child genes as the root gene (of their sub-tree). In block 1508 a current value of the control signal $\lambda$ for the infinite logic aggregator is read, and in block 1510 the value of the first child, second child and control signal are used to evaluate the output of the infinite logic signal aggregator.

If it is determined in block 1512 that the root gene encodes an infinite logic signal inverter, then in block 1514 the child of the root gene is evaluated, in block 1516 the value of the control signal $\gamma$ for the infinite logic signal inverter is read, and in block 1518 the value of the child and the value of the control signal is used to evaluate the output of the infinite logic signal inverter encoded in the root gene. As described below the values of the control signals $\lambda$, $\gamma$ are determined using numerical optimization e.g., a hybrid genetic algorithm/differential evolution subroutine.

Decision block 1520 which is reached if the outcome of decision blocks 1502 and 1512 indicate that the root gene encodes neither an aggregator or an inverter, tests if the root gene encodes an input signal. If so, then the root gene, is set to the value of the input signal. If the outcome of decision block 1520 is negative, then by default the root gene encodes a constant (the only thing left in this particular embodiment) and the value of the root gene is set to the value of the constant. Executing subroutine 1500 effectively propagates terminal values through the tree representation encoded in the chromosome array to the root node.

The subroutine 1500 uses software implementations of the infinite logic signal aggregator and the infinite logic signal inverter. It will be apparent to persons having ordinary skill in the art that the subroutine can be extended to handle any number of other types of networks elements. However, one feature of the configurable infinite logic aggregator 100 and the configurable infinite logic signal inverter 500 is that the two of them alone when combined in different topologies with different control signal settings can be combined to handle a wide range of functions. Moreover, by just using the aggregator 100 and inverter 500 the solution space for gene expression programming network design software can be reduced so that a more exhaustive search of the solution space can be accomplished with allocated computer resources.

Figure 16:
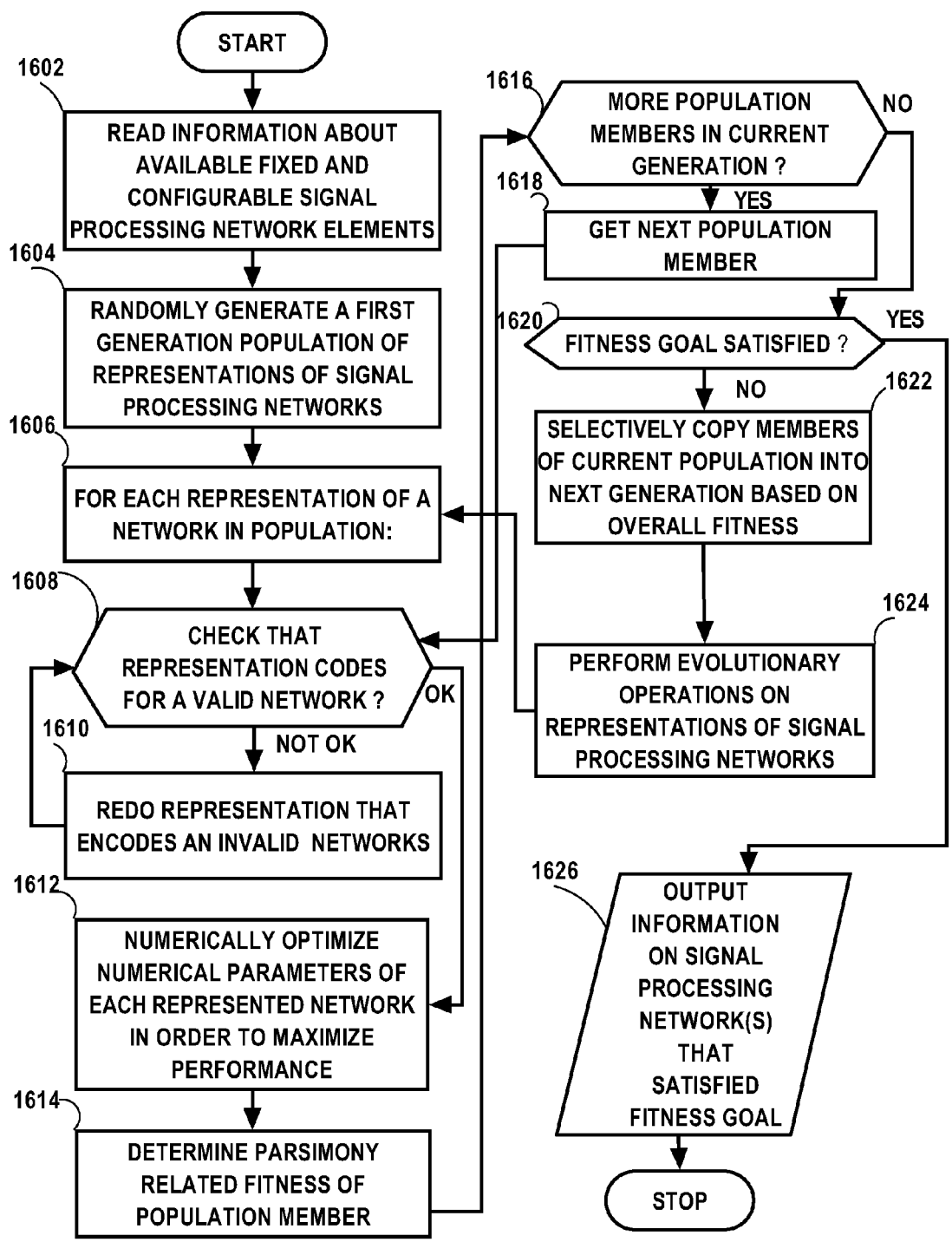
FIG. 16 is a flowchart of a program for automatically designing and optimizing a signal processing network.

FIG. 16 is a flowchart of a program 1600 for automatically designing and optimizing a signal processing network. The program 1600 uses Genetic Programming, in particular, Gene Expression Programming in combination with a numerical optimization method, e.g., a Genetic Algorithm/Differential Evolution hybrid 1700 to design and optimize signal processing networks. In block 1602 a list of available fixed and configurable network elements is read in. According to certain embodiments the list includes the configurable infinite logic signal aggregator 100 and the configurable infinite logic signal inverter 500. The program 1600 uses software versions of these elements. The network elements can also include known types of discrete elements such as capacitors, inductors, diodes, resistors, known type of more complicated elements such as Finite Impulse Response (FIR) filters, Infinite Impulse Response (IIR) filters, decimators, delays, subtracters, adders, Multiply and Accumulate (MAC) signal processors. Other examples of known signal processing blocks are the built-in blocks of Simulink® produced by Mathworks of Natick, Mass.

In block 1604 a first generation of a population (set) of representations of signal processing networks is randomly generated. The population suitably takes the form of a set of chromosome arrays. In generating the first generation, the program 1600 selects genes representing signal processing elements and input signals from a list at random. Table II below includes information about examples of various signal processing elements and the input signals that could be used by the program 1600.

TABLE II

| Network Part | Name | Arity | Cost | Index |
|---|---|---|---|---|
| QA | QA | 2 | 6 | 1 |
| N | N | 1 | 5 | 2 |
| $1^{ST}$ signal | S1 | 0 | 0 | 3 |
| $2^{nd}$ signal | S2 | 0 | 0 | 4 |
| $3^{rd}$ signal | S3 | 0 | 0 | 5 |
| ... | ... | ... | ... | ... |
| $1^{st}$ constant | 1 | 0 | 0 | N + 1 |
| $2^{nd}$ constant | 2 | 0 | 0 | N + 2 |
| ... | ... | ... | ... | ... |

In table II the first column identifies signal processing network elements. QA stands for infinite logic signal aggregator, N stands for infinite logic signal inverter. The second column gives an abbreviated name, which can be used for printing or displaying representations of signal processing networks generated by the program 1600. The third column gives the arity of each signal processing network element. The fourth column gives a cost associated with each element of the signal processing network. The cost is a measure of the added complexity associated with including the element in a signal processing network. Co-pending patent application Ser. No. 10/101,814 entitled "Gene Expression Programming Algorithm" by Weimin Xiao teaches a way to use the cost information in an overall fitness measure that also includes performance based fitness criteria in order to bias genetic programming software toward less complicated solutions. The technique can also be applied in the program 1600 for designing signal processing networks.

The fifth column of Table II gives an integer index that can be used to efficiently encode each element in an integer valued chromosome array. Storing each population as a matrix of the integer indexes in which each row or column represent a population member or as a set of chromosome arrays or vectors of indexes, allows evolutionary operations such as one point crossover, two point crossover, and mutation to be performed at a reduced computational cost, thereby accelerating the program 1600. Also, if such an integer representation is used, then the step of initially generating the first generation amounts to selecting indexes at random for inclusion in the matrix or chromosome array set representation of the population. Each array or vector or matrix row (or column) is a single population member which represents a signal processing network.

Block 1606 is the top of a loop that processes each signal processing network represented in the population. In block 1608 each population member is checked to ensure that it represents a valid population member. The subroutine shown in FIG. 14 and described above can be used for block 1606. If it is determined in block 1608 that a particular population member does not encode a valid signal processing network, then in block 1610 the population member is redone. The population member can be redone by applying some evolutionary operation such as mutating one or more genes at random, or performing a circular shift of the genes, by regenerating a random replacement population member, or by replacing one or more signal processing element encoding gene with input signal genes, for example. After a population member is redone, the program loops back to block 1608 to check the population member again.

After the population member has been redone, or if the population member passed the check performed in block 1608 initially, the program 1600 branches to block 1612. In block 1612 control signal magnitudes and any other adjustable numerical parameters of the signal processing elements in the signal processing network are automatically optimized. The constants shown in Table II are optionally treated as variables that are optimized in block 1612. Examples of subroutines that can be used for block 1612 include programs that implement direct search methods such as the Nelder-Mead algorithm, a Simulated Annealing Algorithm, a Genetic Algorithm, or a Differential Evolution algorithm for example.

Figure 17:
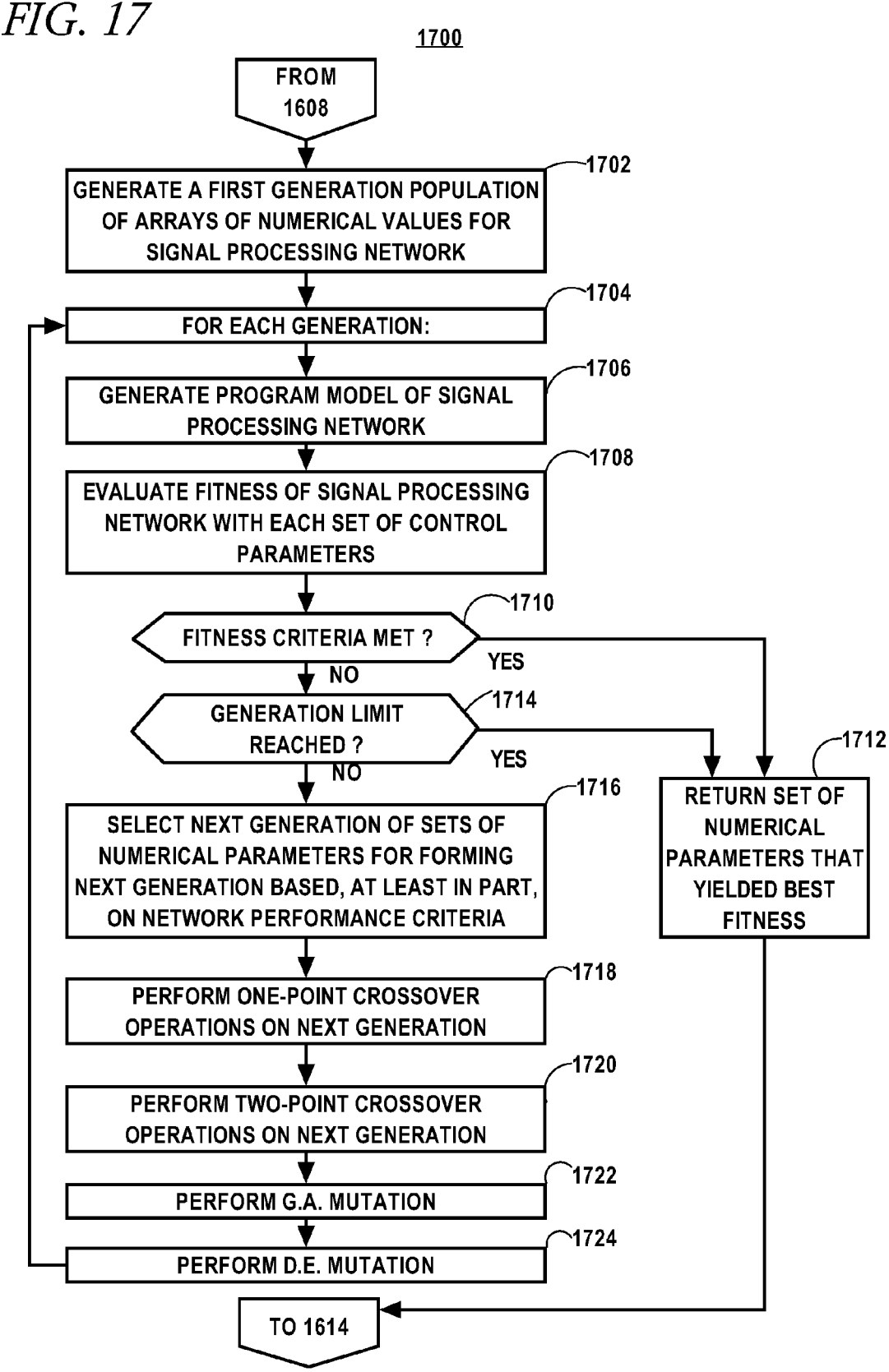
FIG. 17 is a flowchart for a subroutine for automatically optimizing component values, settings and/or control parameters that is used in the program shown in FIG. 16.

FIG. 17 is a flowchart for a subroutine 1700 for automatically optimizing control signal magnitudes and any other adjustable numerical parameters that is used in the program 1600 shown in FIG. 16. The subroutine 1700 shown in FIG. 17 uses a combination Differential Evolution/Genetic Algorithm method. Note that the subroutine 1700 is executed for each population member that is validated in decision block 1608. In block 1702, for each valid population member encoding a signal processing network an initial population of arrays of numerical values is generated. Each set of numerical values includes a control signal magnitude for each infinite logic aggregator, a control signal magnitude for each infinite logic signal inverter and other numerical parameters of parts of the signal processing network encoded in the population member for which the subroutine 1700 is being executed. Alternatively, each set of numerical values is a generic set that includes all numerical values for all signal processing elements (i.e., all signal processing elements in Table II) used by the program 1600. The arrays of numerical values can be stored as arrays or rows or columns of a matrix. Note that the program 1600 and the subroutine 1700 use two distinct types of populations. The program 1600 evolves a population of representations of topologies of signal processing networks with unspecified control signal magnitudes, and possibly unspecified other numerical parameters, whereas the subroutine 1700 evolves a population of control signal magnitudes, and possibly other numerical parameters for each signal processing network topology.

Block 1704 is the top of loop that processes successive generations of the populations of arrays of numerical values that are derived from the initial population.

In block 1706 a program model of the signal processing network being processed in the current iteration of the loop started in block 1606 is generated. The program model may be developed by using subroutines 1300 and 1400 to determine the tree structure of the network. In block 1708 the performance related fitness of the signal processing network, when configured with each set of numerical values is checked.

Block 1710 test if a fitness criteria has been met. Signal processing network fitness is suitably a quantification of at least two things—the ability of the signal processing network to perform its intended function, and the simplicity or parsimony of the signal processing network. The program for optimizing the control signal values and optionally other numerical parameters seeks to optimize the signal processing network performance. The goal of network simplicity is addressed in the main program 1600. Evaluating the ability of each signal processing network to perform its intended function involves feeding test signals in a program model of the network and evaluating the output of a function of the output. Once subroutines 1300 and 1400 have been used to determine the tree structure of the network, subroutine 1500 is used to compute the output of signal processing network in response to particular input signals.

Supervised training, unsupervised training, or indirectly supervised training can be used to obtain measures of the performance of the signal processing network depending on the nature of the application of the signal processing network.

Figure 18:
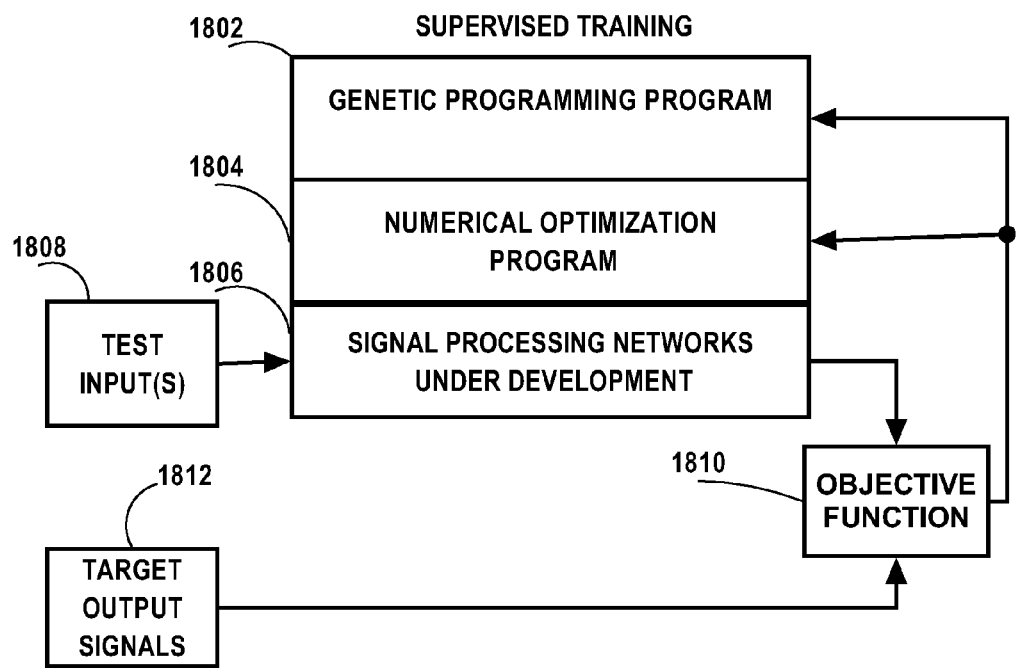
FIG. 18 is block diagram illustrating a system of using the program shown in FIG. 16 in a supervised training methodology.

FIG. 18 is a block diagram illustrating a system 1800 of using the programs shown in FIGS. 16, 17 in a supervised training methodology. In FIG. 18 a genetic programming program 1802, e.g., 1600 utilizes a numerical optimization program 1804, e.g., 1700 to design a signal processing network using a population of signal processing networks 1806. Test inputs 1808 are input into program models of each signal processing network, and the output of the program models of the signal processing network that is produced in response to the test inputs is fed to an objective function computer 1810. Target output signals 1812 are also fed into the objective function computer 1810. The objective function computer 1810 quantifies discrepancies between the output of each signal processing network produced in response to the test inputs 1808 and the target output signals and produces a result, i.e., a performance related fitness measure that is fed back to the genetic programming program 1802 and the numerical optimization program 1804.

The genetic programming program 1802 selects population members for reproduction based, at least in part, on the performance related fitness measure and the numerical optimization program 1804 adjusts control signal values and optionally other numerical parameters based, at least in part on the performance related fitness measure. In the case that subroutine 1700 shown in FIG. 17 is used as the numerical optimization program 1804, population members representing sets of control signal values and optionally other numerical parameters are selected for reproduction based, at least in part on the performance related fitness measure.

One example of using supervised training in the subroutine 1700 is for training configurable infinite logic networks for use in the pattern recognition system 1000 shown in FIG. 10. In this case the test input are feature vectors from a training data set. If an infinite logic network for a particular class is being trained to output a high value e.g., one when a member of the particular class is presented, and a low value e.g., zero when a member of another class is presented, the transcribed identity (target signal) of positive examples of the particular class is a one, and the transcribed identity (target signal) of negative examples is by a zero.

Figure 19:
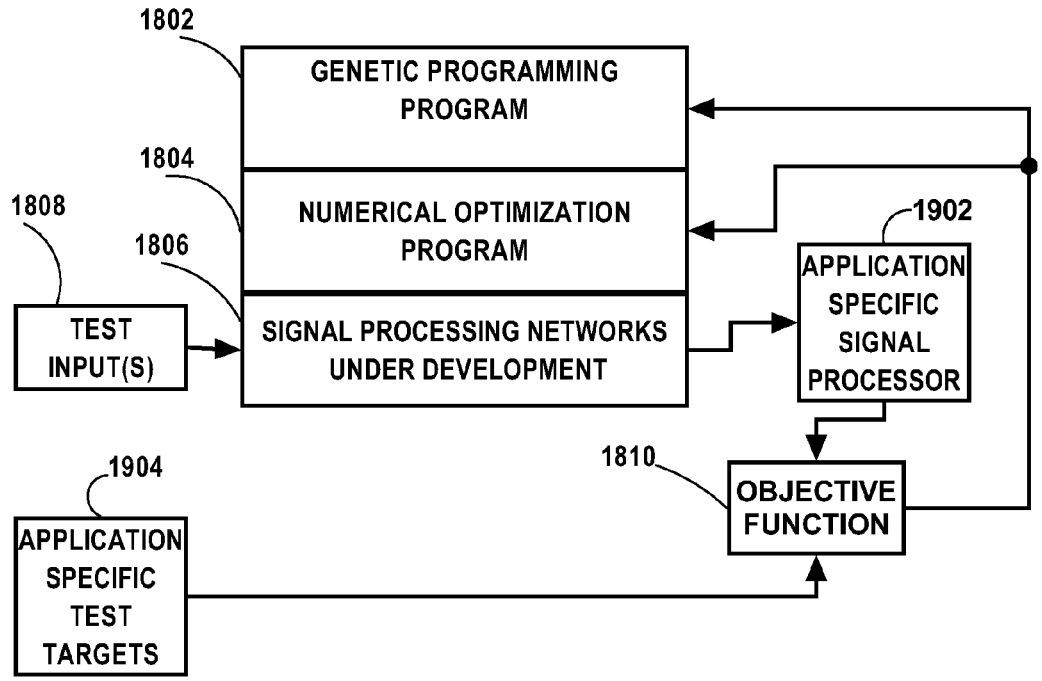
FIG. 19 is block diagram illustrating a system of using the program shown in FIG. 16 in an indirectly supervised training methodology.

FIG. 19 is a block diagram illustrating a system 1900 of using the programs shown in FIGS. 16, 17 in an indirectly supervised training methodology. If indirectly supervised training is used the output of the signal processing networks 1806 is fed to an application specific signal processor 1902. Output of the application specific signal processor 1902 as well as application specific test targets 1904 are fed to the objective function computer 1810.

Figure 20:
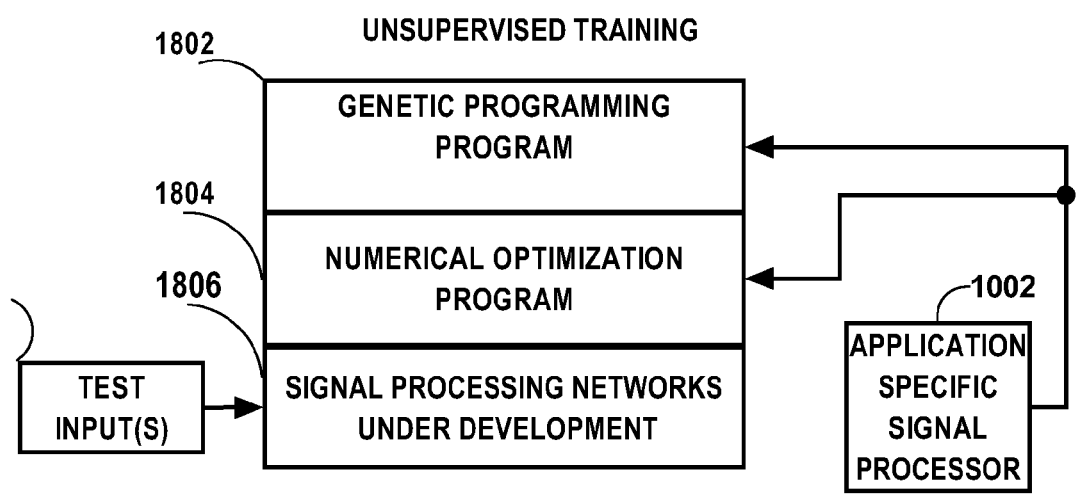
FIG. 20 is a block diagram illustrating a system of using the program shown in FIG. 16 in an unsupervised training methodology.

FIG. 20 is a block diagram illustrating a system 2000 utilizing the programs shown in FIGS. 16, 17 in an unsupervised training methodology. In an unsupervised set up no target output signals 1812 are provided so no objective function computer 1810 is required to compare the target output signals 1812 or application specific test targets 1904 to the output of the signal processing networks 1806, however the application specific signal processor 1902 is used to process the output of the signal processing networks 1806. In unsupervised training, the genetic programming program 1802 and the numerical optimization program 1804 seek to design a signal processing network that maximizes or minimizes the output of the application specific signal processor 1902. In this case the performance related fitness measure is the output of the applications specific processor 1902.

Referring again to FIG. 17 if it is determined in block 1710 that the performance related fitness criteria has been met then in block 1712 the set of control signal values and optionally other numerical parameters that yielded the highest fitness for the signal processing network is returned to the main program 1600 which continues executing at block 1614.

On the other hand if it is determined in block 1710 that the fitness criteria has not yet been met, then execution proceeds to decision block 1714 the outcome of which depends on whether a generation limit has been reached. Note that the generation limit tested in block 1714 applies to the population of control signal values (and optionally other numerical parameters). If the generation limit has been reached the subroutine branches to block 1712, described above. If on the other hand the generation limit has not been reached, then in block 1716 the next generation of sets of numerical parameters (control signal values and optionally other numerical parameters) is selected from the current generation based, at least in part, on fitness. According to the certain embodiments, population members are selected for replication using a stochastic remainder method. In the stochastic remainder method at least a certain number $I_i$ of copies of each population member are selected for replication in a successive generation. The number $I_i$ is given by the following equation:

$$I_i = \text{Trunc}\left(N * \frac{PF_i}{\sum_{i=1}^{N} PF_i}\right) \qquad \text{EQU. 3}$$

where,

N is the number of population members in each generation;

$PF_i$ is the fitness of the $i^{th}$ population member determined in block 1708; and Trunc is the truncation function.

The fractional part of the quantity within the truncation function in equation three is used to determine if any additional copies of each population member (beyond the number of copies determined by equation three) will be replicated in a successive generation. The aforementioned fractional part is used as follows. A random number between zero and one is generated. If the aforementioned fractional part exceeds the random number then an addition copy the $i^{th}$ population member is added to the successive generation. The number of selections made using random numbers and the fractional parts of numbers $I_i$ is adjusted so that successive populations maintain a programmed total number N of sets of control signal values (and optionally other numerical parameters).

Using the above described stochastic remainder method leads to selection of population members for replication based largely on fitness, yet with a degree of randomness. The latter selection method mimics natural selection in biological systems.

In block 1718 one point cross-over operations are performed on some of the arrays of numerical values that have been replicated. In block 1720 two-point crossover operations are performed on some of the arrays of numerical values that have been replicated. In performing crossover operations population members are paired together (e.g., randomly). A single crossover probability or separate crossover probabilities may be used in deciding whether or not to perform one and two point crossover operations. For each type of crossover operation, and for each pair of population members a random number between zero and one is generated. If the random number is less than the crossover probability, then a crossover operation is performed, if the random number is greater than the crossover operation then the pair of population members is kept unchanged. Alternative methods for determining whether crossover operations are performed may be used. If it is determined that a one point crossover operation is to be performed between a pair of population members then a crossover point is selected at random. Thereafter, all the elements (numerical values) in the two population members that follow the crossover point are exchanged between the two arrays of numerical values. If it is determined that a two-point crossover operation is to be performed between two population members, then two points are selected at random and elements of the population members (arrays of numerical values) between the two points are exchanged.

In block 1722 a genetic algorithm (G.A.) mutation operation is performed on selected numerical values. One form of G.A. mutation is expressed by the following formula:

$$x_i^{new} = x_i + (rand - 0.5)(0.1 x_i + eps) \qquad \text{EQU. 4}$$

where, $x_i$ is a numerical value being mutated $x_i^{new}$ is a mutated numerical value;

eps is a machine constant equal to the smallest number that can be represented in the floating point system of the machine Note that equation four illustrates a mutation limited to a maximum of plus or minus 5%. 5% is a reasonable limit for mutation but may be changed if desired.

In block 1724 differential evolution (D.E.) mutation is performed on selected population members. Note that in D.E. mutation operates on an entire population member which is an set of numerical values. Note also that in performing D.E. mutation the population member is treated as an ordered set (e.g., vector or array) of numerical values. One form of D.E. mutation is expressed by the following formula:

$$X_i^{new} = X_{best} + f(X_j + X_k - X_l - X_m) \qquad \text{EQU. 5}$$

where, $X_i^{new}$ is a new population member that replaces population member X that has been selected for D.E. mutation;

$X_{best}$ is the population member that yielded the highest fitness;

$X_j$, $X_k$, $X_l$, $X_m$, are other population members (e.g., other population members selected at random; and f is a scalar factor that is suitably set to a value in the range of between 0.1 to two.

Every numerical value in the replicated population is considered a candidate for applying G.A. mutation and every array of numerical values is considered a candidate for D.E. mutation. In order to determine whether G.A. mutation and D.E. mutation is applied to each numerical value and set of numerical values respectively, a random number between zero and one can be generated for each entity and compared to preprogrammed G.A. and D.E. mutation probabilities. If the random number is less than the preprogrammed G.A. or D.E. mutation probabilities then the entity (i.e. numerical value or array of numerical values respectively) is mutated. Although not shown in FIG. 17, alternatively other evolutionary operations may be performed.

After, block 1724, the subroutine loops back to block 1704 and continues executing as previously described. Thus, successive generations of populations of arrays of numerical values will be evolved until the performance related fitness criteria is met or a generation limit is reached.

After the subroutine 1700 is exited, upon returning to the main program 1600 shown in FIG. 16, block 1614 is executed. In block 1614 a parsimony fitness measure that is indicative of the simplicity of the signal processing network is computed. Simplicity is preferred because it generally implies less complex hardware and low power consumption. One way to quantify cost is to sum a cost assigned to each signal processing element of a signal processing network. The cost associated with each signal processing element is given in the fourth column of table II. Thus, according to certain embodiments, the parsimony related fitness for a $j^{th}$ signal processing network is:

$$NC_j = \sum_{network} Cost_i \qquad \text{EQU. 6}$$

where, $NC_j$ stands for the cost of the $j^{th}$ signal processing network; and $Cost_i$ is the cost of the $i^{th}$ signal processing element in the $j^{th}$ signal processing network.

Next, the program 1600 continues to decision block 1616 which tests if more population members in the current generation remain to be processed. If so block 1618 gets a next population member and then the program 1600 loops back to block 1608 and continues executing as previously described until all population members of the current generation have been processed.

When it is determined in decision block 1616 that all of the population members of the current generation have been processed, then the program branches to block 1620. Decision block 1620 tests if an overall fitness goal has been reached. The overall fitness goal takes into account the fitness measure related to signal processing performance and the parsimony related fitness. According to one embodiment, the two component fitness measures are combined in a weighted sum that uses a programmed weight, i.e.:

$$F_j = (1-p) \cdot PF_j + p \cdot NC_j \qquad \text{EQU. 5}$$

where, $F_j$ is an overall measure of fitness of an $j^{th}$ signal processing network that is represented by an $j^{th}$ population member;

$PF_j$ is the performance related fitness measure;

$NC_j$ is the parsimony related fitness measure; and p is a parsimony weighting factor that determines the weight to be given to the parsimony related measure of fitness in the overall measure of fitness.

The decision block 1616 compares the overall fitness to a programmed fitness goal G. According to certain embodiments the parsimony weighting factor p and the goal G are varied during the run of the program 1600. For example the parsimony weighting factor p can initially be set to a low value (and possibly to zero), and later increased. The timing of changing the p and G can be based on the value of the overall fitness measure, the generation-to-generation change of the overall fitness measure or on the generation number.

If it is determined in block 1616 that the fitness goal G has been satisfied, then the program 1600 branches to block 1626 in which information on the signal processing network that satisfied the fitness goal is output e.g., on a computer display. The information can also be written to an output file.

If it is determined in block 1616 that the fitness goal has not yet been satisfied then in block 1622 population members are selected for replication in the next generation based on overall fitness. The same stochastic remainder method discussed above that is used in selecting from populations of arrays of numerical values in the subroutine 1700 can be used in block 1622 as well. However, in block 1622 it is the overall fitness that is used in the stochastic remainder method. The overall fitness includes the performance related fitness that is achieved with the high fitness set of numerical values for each particular network.

Next in block 1624 evolutionary operations are performed on the populations members (e.g., arrays, vectors, rows or columns) that have been selected in block 1622. The evolutionary operations that are performed suitably include one-point crossover, two-point crossover and mutation. The one-point and two-point crossover operations are the same as described above in connection with subroutine 1700 but are applied to the population members representing signal processing networks that are evolved by the main program 1600. In program 1600 mutation involves replacing a randomly selected gene (e.g., signal processing element gene or input signal gene) with another randomly selected gene. Determination of whether a particular gene in a particular chromosome will be mutated can be made using random numbers between zero and one and a programmed mutation rate as described above in connection with G.A. mutation and D.E. mutation performed in subroutine 1700.

Block 1622 and block 1624 serve to prepare a new generation of signal processing networks by selecting members of the current generation for inclusion in the next generation based on fitness, and then performing evolutionary operation on the selected members. After block 1626 the program 1600 loops back to block 1606 in order to process the new generation, as previously described.

Because of the lack of constraint on the topologies that may produced by the gene expression program 1600, and the flexibility of the configurable infinite logic signal aggregator 100 and the configurable infinite logic signal inverter 500 described above with reference to FIGS. 2-4, 6, networks for a wide range of applications including but not limited to pattern recognition can be designed.

One skilled in the art will appreciate that the programs and subroutines described above can be altered according to the programming language in which it is written and individual programming style, without substantially departing from the underlying algorithms.

Figure 21:
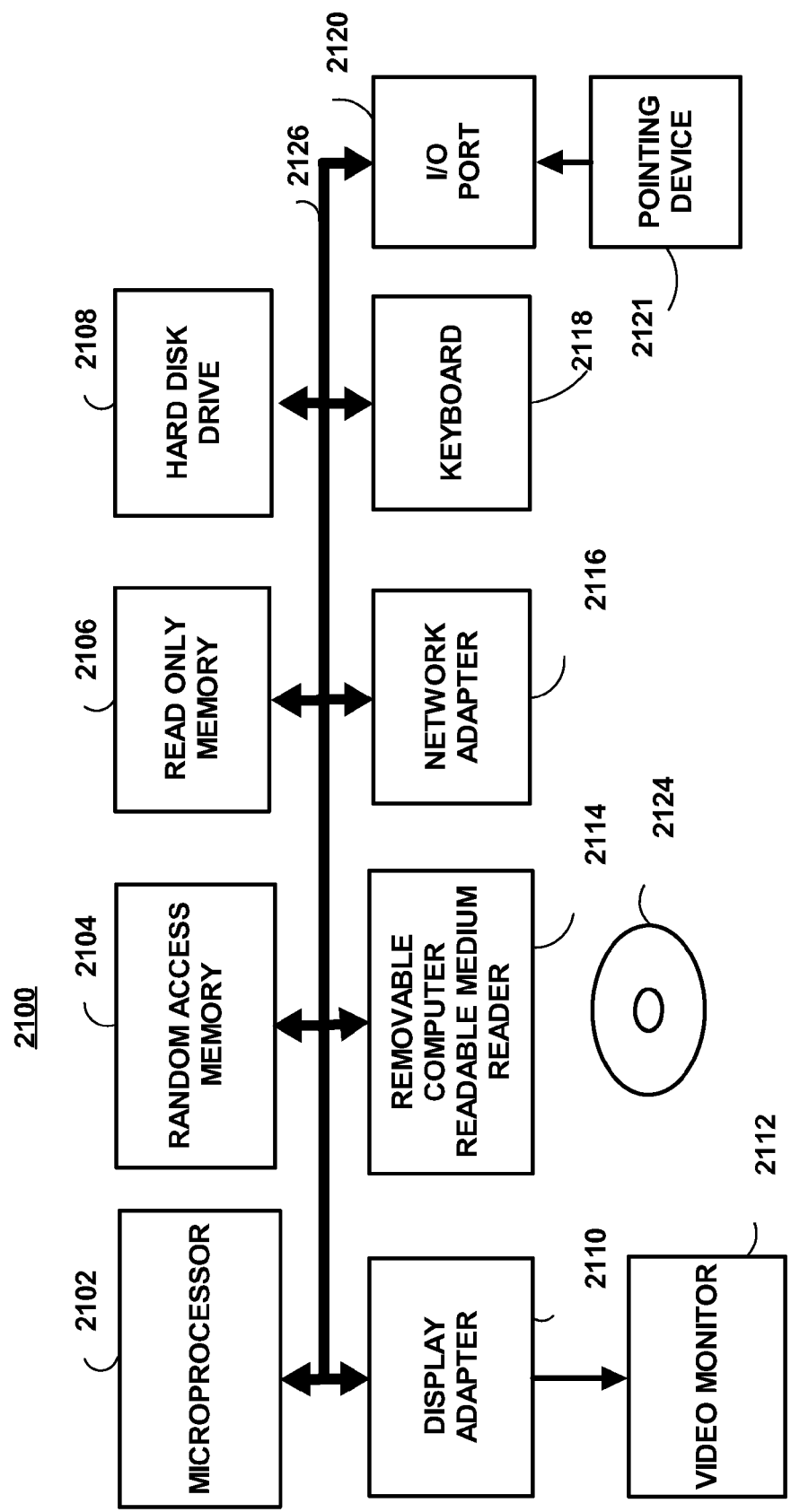
FIG. 21 is a block diagram of a computer that can be used to execute the programs shown in FIGS. 13, 14, 15, 16, 17 according to embodiments of the invention.

FIG. 21 is a block diagram of a computer 2100 that can be used to execute the programs and subroutines described above according to embodiments of the invention. The computer 2100 comprises a microprocessor 2102, Random Access Memory (RAM) 2104, Read Only Memory (ROM) 2106, hard disk drive 2108, display adapter 2110, e.g., a video card, a removable computer readable medium reader 2114, a network adaptor 2116, keyboard 2118, and I/O port 2120 communicatively coupled through a digital signal bus 2126. A video monitor 2112 is electrically coupled to the display adapter 2110 for receiving a video signal. A pointing device 2122, suitably a mouse, is coupled to the I/O port 2120 for receiving signals generated by user operation of the pointing device 2122. The network adapter 2116 can be used, to communicatively couple the computer to an external source of data, e.g., a remote server. The computer readable medium reader 2114 suitably comprises a Compact Disk (CD) drive. A computer readable medium 2124, that includes software embodying the programs and subroutines described above is provided. The software included on the computer readable medium 2124 is loaded through the removable computer readable medium reader 2114 in order to configure the computer 2100 to carry out programs and subroutines of the current invention that are described above with reference to the FIGS. The computer 2100 may for example comprise a personal computer or a work station computer. A variety of types of computer readably medium including, by way of example, optical, magnetic, or semiconductor memory are alternatively used to store the programs, subroutines and data-structures described above. It will be apparent to one of ordinary skill in the programming art that the programs may be varied from what is described above.

By using a separate specialized numerical optimizations for finding optimum component values, settings and configuration parameters, a genetic programming program (e.g., 1600) can be relieved of the burden of finding numerical values so that the genetic programming program will be focused on the task to which it is more suited-determining an optimum signal processing network architecture. This arrangement is believed to be more efficient in certain cases than using genetic programming alone, e.g., using gene expression programming to determine both the architecture and accurate numerical parameters.

The configurable infinite logic aggregator and inverter provide a relatively complete function set which when combined in various topologies as determined by the genetic programming program can serve in a variety applications including but not limited to pattern recognition, regression, classification, data fusion.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A signal processing network comprising:

a signal aggregator comprising a first signal input, a second signal input, a first signal output and a first control signal input, wherein said signal aggregator is configurable by applying a first variable magnitude control signal to said first control signal input, wherein setting said first variable magnitude control signal to a first magnitude configures said aggregator to operate as an infinite logic AND gate, wherein setting said first variable magnitude control signal to a second magnitude configures said aggregator to operate as an infinite logic OR gate, and wherein operation of said signal aggregator varies between said infinite logic AND gate and said infinite logic OR gate as said first variable magnitude control signal varies in magnitude between said first magnitude and said second magnitude;

an infinite logic signal inverter comprising a third signal input, a second signal output and a second control signal input, wherein an input-output relation of said infinite logic signal inverter is a function of a second variable magnitude control signal applied to said second control signal input; and wherein, said signal aggregator and said infinite logic signal inverter are coupled.

2. The signal processing network according to claim 1 wherein said signal aggregator comprises:

a first adder comprising a first input coupled to said first signal input, a second input coupled to said second signal input and a first adder output;

a first multiplier comprising a first input coupled to said first signal input, a second input coupled to said second signal input and a first multiplier output;

a second multiplier comprising a first input coupled to said first multiplier output, a second input coupled said first control signal input and a second multiplier output;

a second adder comprising a first input coupled to said first adder output, a second input coupled to said second multiplier output, and a second adder output;

a third adder comprising a first input coupled to said first control signal input, a second input set to a constant, and a third adder output; and a divider comprising a numerator input coupled to said second adder output, a denominator input coupled to said third adder output, and an divider output coupled to said first signal output of said aggregator.

3. The signal processing network according to claim 1 wherein said infinite logic signal inverter comprises:

a subtracter comprising a first input set to a constant; a second input coupled to said third signal input of said infinite logic signal inverter, and a subtracter output;

a multiplier comprising a first input coupled to said third signal input of said infinite logic signal inverter, a second input coupled to said second control signal input of said infinite logic signal inverter, and a multiplier output;

an adder comprising a first input set to said constant, a second input coupled to said multiplier output, and an adder output;

a divider comprising a numerator input coupled to said subtracter output, a denominator input coupled to said adder output, and an output coupled to said second signal output of said infinite logic signal inverter.

4. The signal processing network according to claim 3 wherein said infinite logic signal inverter further comprises:

a comparator comprising a first input set to said constant, a second input coupled to said third signal input of said infinite logic signal inverter, and a comparator output;

a ROM storing a fixed value of zero, coupled to said second signal output of said infinite logic signal inverter, wherein said ROM has a first enable input coupled to said comparator output; and wherein said subtracter, said multiplier, said adder, and said divider are included in a circuit block that includes a second enable input that is also coupled to said comparator output.

5. The signal processing network according to claim 1 wherein:

said signal aggregator operates according to a first piecewise equation:

$$A_\lambda(a_1, \ldots, a_n) = \begin{cases} \dfrac{\prod_{i=1}^{n}(1+\lambda a_i) - 1}{\prod_{i=1}^{n}(1+\lambda) - 1} & \lambda \geq -1, \lambda \neq 0 \\ \dfrac{1}{n}\sum_{i=1}^{n} a_i & \lambda = 0 \end{cases}$$

where, $\lambda \epsilon [-1, +\infty)$ is said first variable magnitude control signal;

$a_k \epsilon [0,1]$ is a $k^{th}$ input signal;

n is a number of input signals; and $A_\lambda(a_1, \ldots, a_n) \epsilon [0,1]$, is an output signal magnitude.

6. The signal processing network according to claim 5 wherein:

said infinite logic signal inverter operates according to a second equation:

$$Inv(x) = \begin{cases} \dfrac{1-x}{1+\gamma x} & x \neq 1 \\ 0 & x = 1 \end{cases}$$

where, $x \epsilon [0,1]$, is a value of an input signal to said infinite logic signal inverter;

$\gamma \epsilon [-1, +\infty)$, is the second variable magnitude control signal; and $Inv(x) \in [0,1]$, is an output signal of the signal inverter.

7. The signal processing network according to claim 6 wherein said signal aggregator and said infinite logic signal inverter comprise a microprocessor programmed according to said first equation and said second equation.

8. The signal processing network according to claim 1 wherein:

said infinite logic signal inverter operates according to an equation:

$$Inv(x) = \begin{cases} \dfrac{1-x}{1+\gamma x} & x \neq 1 \\ 0 & x = 1 \end{cases}$$

where, $x \epsilon [0,1]$, is a value of an input signal to said infinite logic signal inverter; and $\gamma \epsilon [-1, +\infty)$ is the second variable magnitude control signal.

9. The signal processing network according to claim 1 comprising a plurality of signal aggregators.

10. The signal processing network according to claim 1 comprising a plurality of infinite logic signal inverters.

11. A pattern recognition system comprising:

a sensor for obtaining measurements of a subject to be recognized;

a feature vector extractor coupled to said sensor, wherein said feature vector extractor serves to produce feature vectors from said measurements;

one or more signal processing networks according to claim 1 coupled to said feature vector extractor for receiving said feature vectors produced by said feature vector extractor;

a decision logic coupled to said one or more signal processing networks according to claim 1 wherein said decision logic classifies said subject to be recognized based on output of said one or more signal processing networks according to claim 1.

12. A computer configured by software to decode an array representation of a signal processing network, wherein said computer is programmed by said software to:

execute a recursive routine that comprises:

receive a sequence of genes representing signal processing elements, and terminals including signal inputs;

check if a first gene of said sequence of genes encodes a signal processing element, if said first gene does not encode a signal processing element terminating, and if said first gene does encode a signal processing element:

set a total number of children for said first gene to a number of inputs of said signal processing element;

initialize a first gene pointer to point to a second gene of said sequence following said first gene;

initialize a children counter;
associate said second gene with said first gene as a child of said first gene;
determine a length of a portion of said sequence of genes that encodes a sub-tree rooted by said child, wherein said sub-tree is part of a tree representation of the signal processing network;
recursively apply this recursive routine to said sequence of genes that encodes said sub-tree;
if said first gene has more children:
increment said children counter to indicate a next child;
set said first gene pointer to point to said next child in said sequence of genes which follows said portion of said sequence of genes; and
associate said next child with said first gene as a child of said first gene; and
return to said step of determining for said next child; and
If said first gene does not have more children, terminate.

13. The computer configured by software according to claim 12, wherein, in determining said length of said portion of said sequence of genes that encodes said sub-tree rooted by said child comprises, said computer is programmed to:
initialize a second gene pointer to point to said child;
initialize a required gene variable;
until the required gene variable is equal to zero;
increment the required gene variable by a number of signal inputs of a signal processing element coded by a current gene minus one;
increment the second pointer to point to a next gene; and
when said required gene variable is equal to zero, report said length that is based on said second gene pointer value.

14. The computer configured by software according to claim 13 wherein:
said second gene pointer is initialized to zero, wherein said child is considered a zeroth gene of said portion; and
reporting said length comprises reporting said second gene pointer.

15. The computer according to claim 12 further configured by software to evaluate output of the signal processing network in response to particular inputs, by:
starting at said first gene of said sequence of genes that represents a root in said tree representation of said signal processing network, and recursively applying a procedure of:
evaluating each child gene of each gene; and
using values output by each child gene to evaluate said gene,
whereby, terminal values are propagated through said tree representation of said signal processing network to an output of said root in said tree representation.

16. A computer configured by software to:
generate an initial population including a plurality of representations of signal processing networks that includes a logical aggregator signal processing element and a logical inverter signal processing element;
for each of a succession of generations of said population derived from said initial population:
check if a fitness goal has been achieved by one or more signal processing networks represented in said population;
if said fitness goal has been achieved:
output information relative to one or more signal processing networks that achieved said fitness goal;
if said fitness goal has not been achieved:
selectively replicate said plurality of representations for a next generation based on, at least, a fitness measure; and
perform evolutionary operations on said next generation.

17. The computer according to claim 16 wherein, in checking if said fitness goal has been achieved by one or more signal processing networks represented in said population, said computer is programmed by software to evaluate an overall fitness measure that includes a performance related fitness measure and a parsimony related fitness measure.

18. The computer according to claim 16, wherein said computer is configured by software to:
represent each signal processing network by a chromosome array, that includes gene elements that represent signal processing elements and one or more signal sources; and
in performing evolutionary operations on said next generation, said computer performs one or more evolutionary operations selected from a group consisting of one-point crossover two-point crossover, and mutation.

19. The computer configured by software according to claim 16 wherein:
said logical aggregator signal processing element, comprises an infinite logic aggregator that is configurable by adjusting a first magnitude of a first control signal;
said logical inverter signal processing element, comprises a infinite logic signal inverter that is configurable by adjusting a second magnitude of a second control signal; and
wherein for each of said succession of generations of said population derived from said initial population:
prior to checking if said fitness goal has been achieved;
said computer is programmed to numerically optimize said first magnitude and said second magnitude.

20. The computer according to claim 19 wherein, in numerically optimizing said first magnitude and said second magnitude, said computer is configured by software to:
generate an initial population including a plurality of sets of numerical parameters to be used with each signal processing network, wherein said sets of numerical parameters include said first magnitude and said second magnitude;
for each of a succession of generations of said population of said plurality of sets of numerical parameters:
evaluate a measure of performance related fitness for each signal processing network when configured with each of said plurality of sets of numerical parameters;
check, at least, if a performance related fitness criteria has been satisfied;
if, at least, said performance related fitness criteria has not been satisfied:
selected a next generation of sets of numerical parameters from a current generation of sets of numerical parameters based, at least in part, on said performance related fitness;
perform evolutionary operations on said next generation of sets of numerical parameters;
if, at least, said performance related fitness criteria has been satisfied:
return a set of numerical parameters that yield a best performance.

21. The computer according to claim 20 wherein, in performing said evolutionary operations on said next generation of sets of numerical parameters, said computer is configured by software to:
perform differential evolution mutation.

22. The computer configured by software according to claim 19 wherein:

said infinite logic aggregator varies continuously from an infinite logic AND operator to an infinite logic OR operator as a function of said first magnitude.

23. The computer according to claim 16 further configured by software to:

check that each of said plurality of representations of signal processing networks encodes a valid signal processing network.

24. The computer according to claim 23, wherein said computer is configured by software to:

represent each signal processing network by a chromosome array, that includes gene elements that represent signal processing elements and one or more signal sources; and wherein, in checking that each of said plurality of representations of signal processing networks encodes a valid signal processing network, said computer is programmed to:

read a maximum chromosome length;

set an index that points to successive gene elements to an initial value;

initialize a required gene variable;

until said required gene variable is equal to zero OR said index is equal to said maximum chromosome length:

increase said required gene variable by one less than a number of inputs required for a signal processing element coded by a gene element identified by said index that points to successive gene elements; and increment said index that points to successive gene elements;

after, said required gene variable is equal to zero OR said index is equal to said maximum chromosome length check if said required gene variable is greater than zero and if so returning an invalid chromosome indication.

* * * * *

UNITED STATES PATENT AND TRADEMARK OFFICE
CERTIFICATE OF CORRECTION

| | |
|---|---|
| PATENT NO. | : 7,761,392 B2 |
| APPLICATION NO. | : 11/554734 |
| DATED | : July 20, 2010 |
| INVENTOR(S) | : Mohamed et al. |

It is certified that error appears in the above-identified patent and that said Letters Patent is hereby corrected as shown below:

IN THE DRAWINGS:

1. In Fig. 20, Sheet 14 of 15, delete " 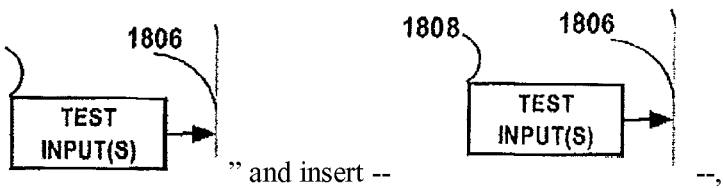 " and insert -- --, therefor.

2. In Fig. 21, Sheet 15 of 15, delete, Tag "2121" and insert -- 2122 --, therefor.

IN THE SPECIFICATION

3. In Column 5, Line 25, delete "In the this" and insert -- In this --, therefor.

4. In Column 12, Line 58, in Table II, under "Network Part", delete "1ST" and insert -- 1st --, therefor.

5. In Column 17, Line 20, delete "an" and insert -- a --, therefor.

6. In Column 17, Line 29, delete "X" and insert -- Xi --, therefor.

IN THE CLAIMS

7. In Column 20, Line 66, in Claim 2, delete "coupled said" and insert -- coupled in said --, therefor.

8. In Column 21, Line 9, in Claim 2, delete "an divider" and insert -- a divider --, therefor.

9. In Column 22, Line 13, in Claim 6, delete "E" and insert -- ε --, therefor.

Signed and Sealed this
Eighth Day of November, 2011

David J. Kappos
*Director of the United States Patent and Trademark Office*

10. In Column 23. Line 18, in Claim 12, delete "If" and insert -- if --, therefor.

11. In Column 24, Line 21, in Claim 18, delete "crossover two-point" and insert -- crossover, two-point --, therefor.